(12) United States Patent
Jen et al.

(10) Patent No.: US 10,747,688 B2
(45) Date of Patent: Aug. 18, 2020

(54) LOW LATENCY RETIMER

(71) Applicant: Intel Corporation, Santa Clara, CA (US)

(72) Inventors: Michelle Jen, Mountain View, CA (US); Debendra Das Sharma, Saratoga, CA (US); Venkatraman Iyer, Round Rock, TX (US); Tao Liang, Westford, MA (US)

(73) Assignee: Intel Corporation, Santa Clara, CA (US)

( * ) Notice: Subject to any disclaimer, the term of this patent is extended or adjusted under 35 U.S.C. 154(b) by 57 days.

(21) Appl. No.: 15/387,802

(22) Filed: Dec. 22, 2016

(65) Prior Publication Data

US 2018/0181502 A1    Jun. 28, 2018

(51) Int. Cl.
*G06F 13/16* (2006.01)
*G06F 13/42* (2006.01)
*G06F 13/40* (2006.01)

(52) U.S. Cl.
CPC ........ *G06F 13/161* (2013.01); *G06F 13/4022* (2013.01); *G06F 13/4282* (2013.01)

(58) Field of Classification Search
CPC . G06F 1/02; G06F 13/42; H04L 7/034; H04L 7/0331; H04L 41/0866
See application file for complete search history.

(56) References Cited

U.S. PATENT DOCUMENTS

| 4,769,777 | A | * | 9/1988 | Bittle | ........................ | H03K 3/84 |
| | | | | | | 708/251 |
| 2005/0018760 | A1 | | 1/2005 | Smith et al. | | |
| 2005/0086336 | A1 | | 4/2005 | Haber | | |
| 2011/0179212 | A1 | | 7/2011 | Hartman | | |
| 2015/0172090 | A1 | | 6/2015 | Sawyer | | |
| 2015/0261718 | A1 | * | 9/2015 | Campbell | ........... | G06F 13/4286 |
| | | | | | | 710/302 |
| 2016/0028537 | A1 | * | 1/2016 | Erdogan | ................. | H04L 7/033 |
| | | | | | | 375/374 |
| 2016/0191313 | A1 | * | 6/2016 | Chen | ................... | H04L 41/0816 |
| | | | | | | 370/315 |
| 2016/0377679 | A1 | * | 12/2016 | Froelich | ................... | H04B 3/46 |
| | | | | | | 714/735 |
| 2017/0039162 | A1 | * | 2/2017 | Mishra | ................ | G06F 13/4282 |
| 2017/0257273 | A1 | * | 9/2017 | Li | ........................... | H04L 43/08 |
| 2018/0227149 | A1 | * | 8/2018 | Johnson | ............ | H04L 25/03019 |

FOREIGN PATENT DOCUMENTS

WO    2012170829 A1    12/2012

OTHER PUBLICATIONS

International Search Report and Written Opinion in International Application No. PCT/US2017/062452, dated Mar. 13, 2018, 8 pages.

* cited by examiner

*Primary Examiner* — Getente A Yimer
(74) *Attorney, Agent, or Firm* — Alliance IP, LLC

(57) ABSTRACT

A retimer device receives a first signal from a first device and regenerates the first signal to send to a second device. The retimer further receive a second signal from the second device and regenerates the second signal to send to the first device, where the first device includes a processor device. The retimer includes a sideband interface to connect to the first device and further includes protocol logic to monitor the first signal, determine that the first signal includes a pattern defined in a protocol to identify a protocol activity, and participate in performance of the protocol activity using the sideband interface.

19 Claims, 14 Drawing Sheets

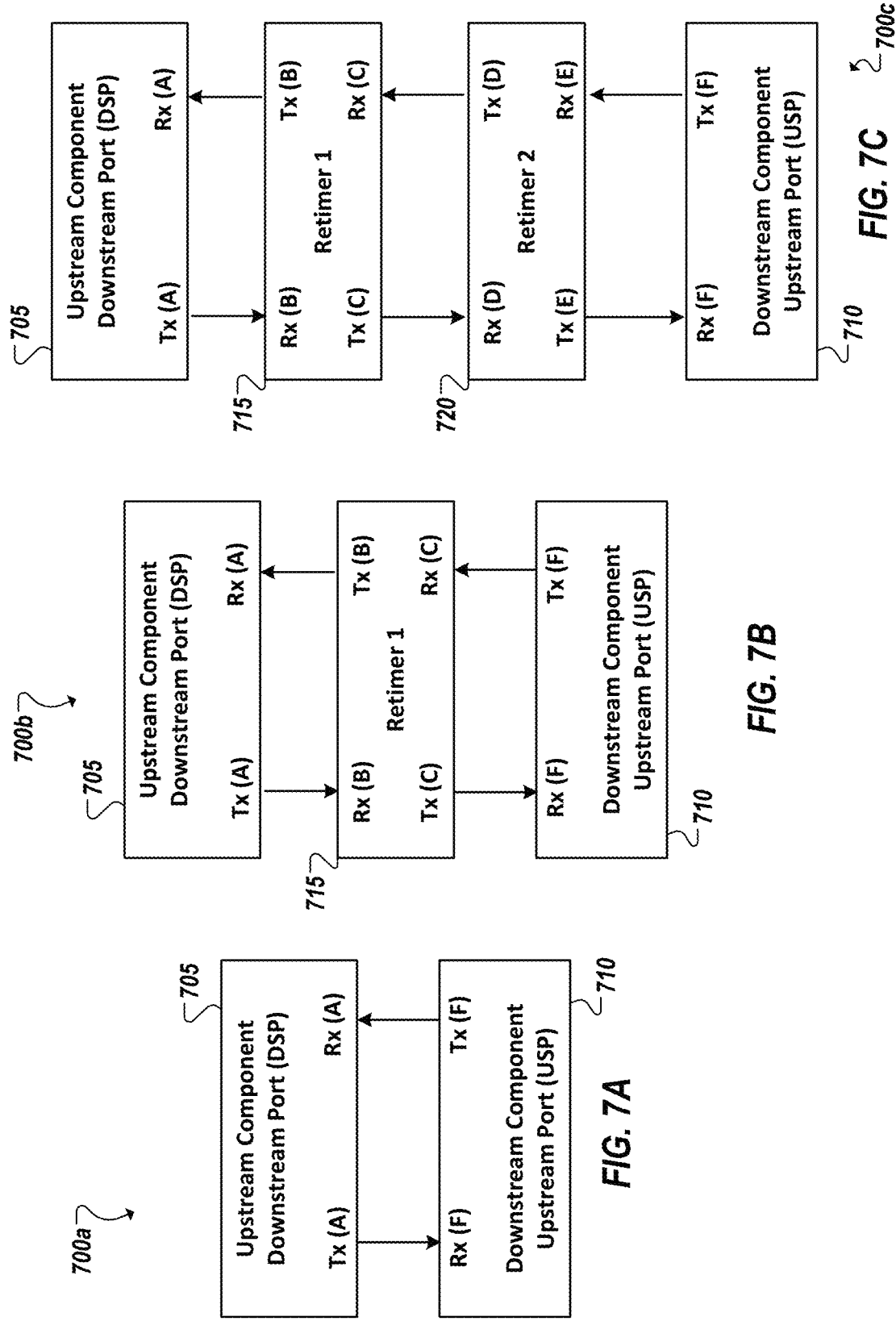

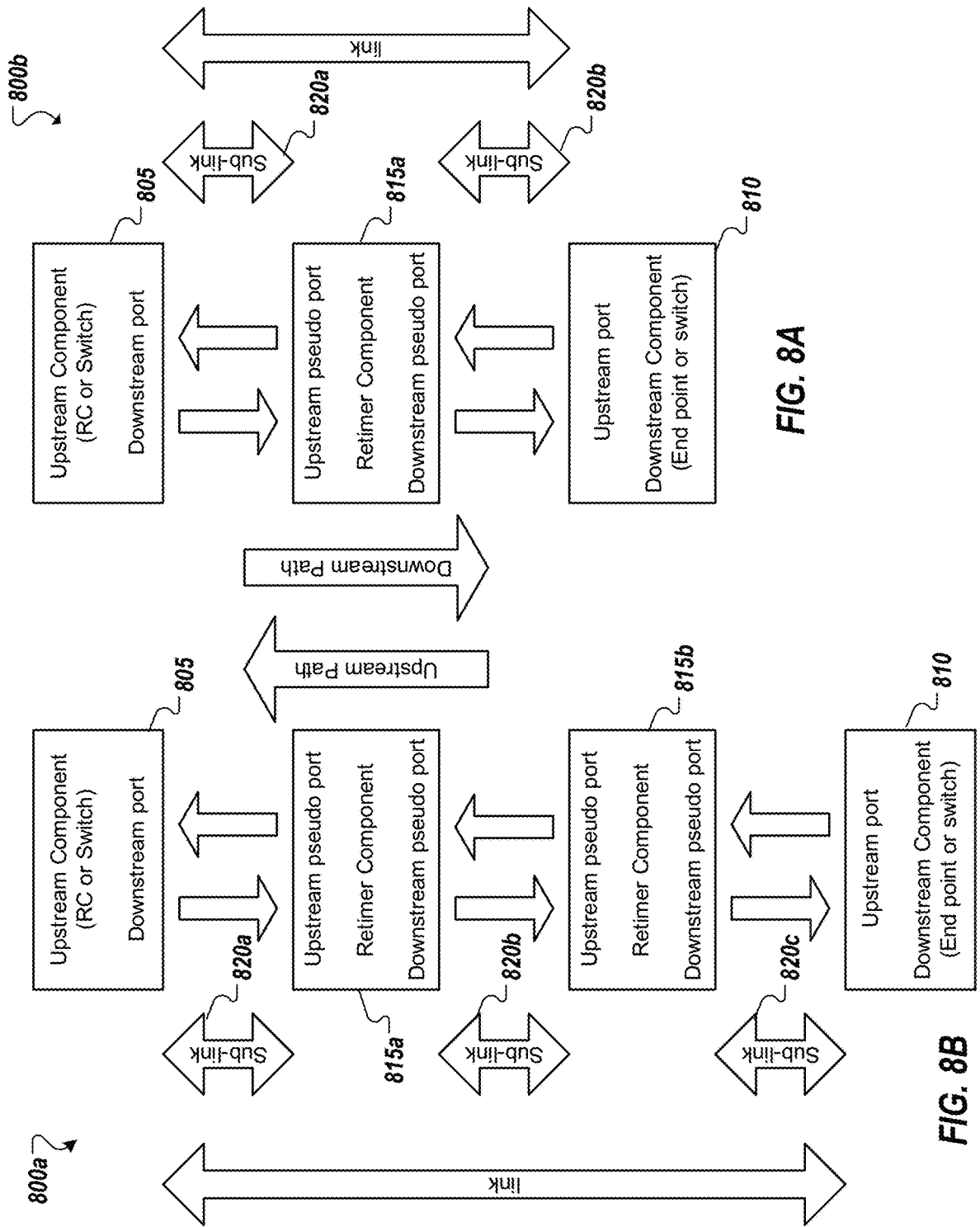

LOW LATENCY RETIMER

FIELD

This disclosure pertains to computing system, and in particular (but not exclusively) to point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIGS. 7A-7C illustrate simplified block diagrams of example implementations of a test mode for determining errors in one or more sublinks of a link.

FIGS. 8A-8B illustrate simplified block diagrams of example links including one or more extension devices.

DETAILED DESCRIPTION

Figure 1:
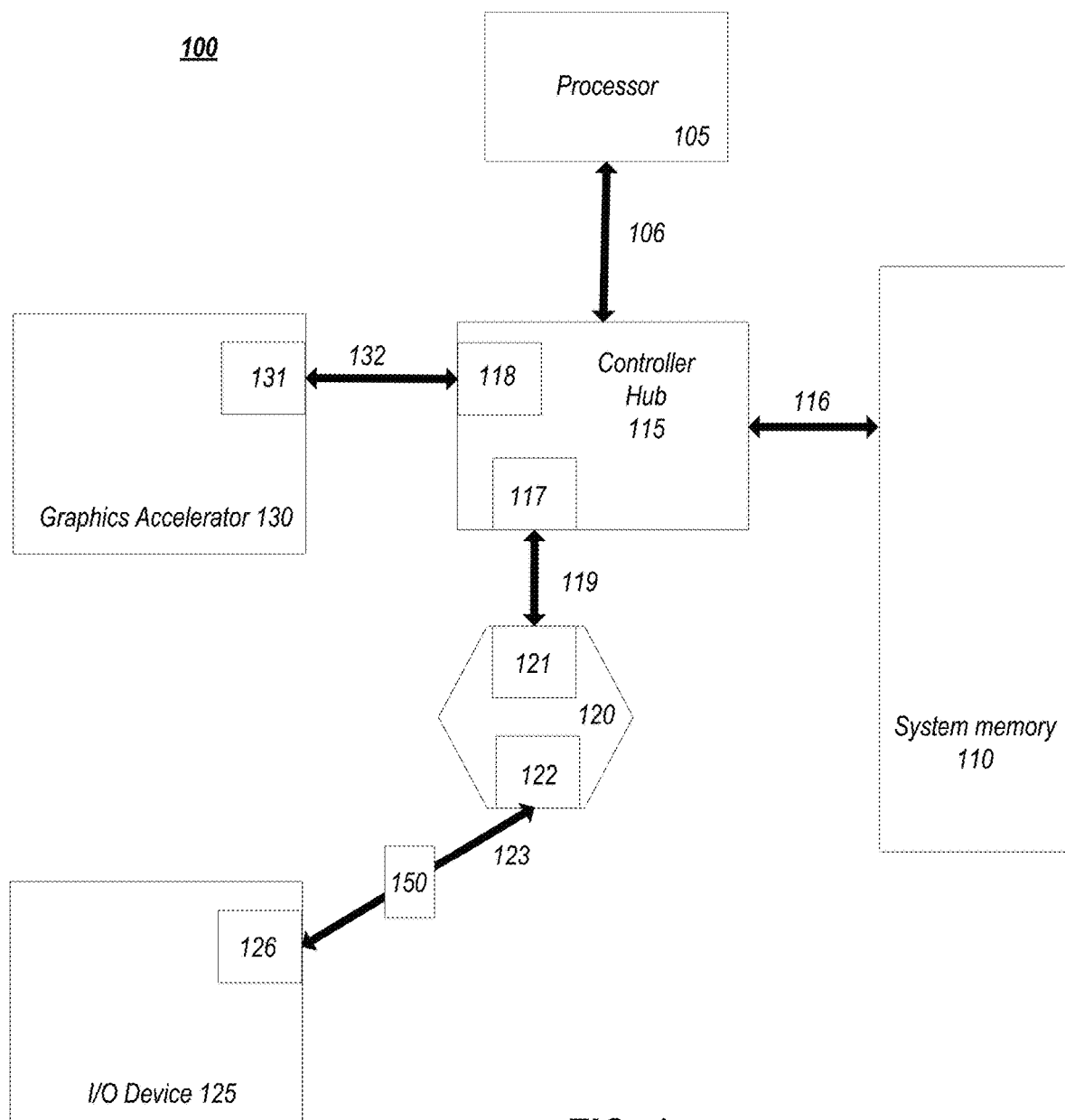
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
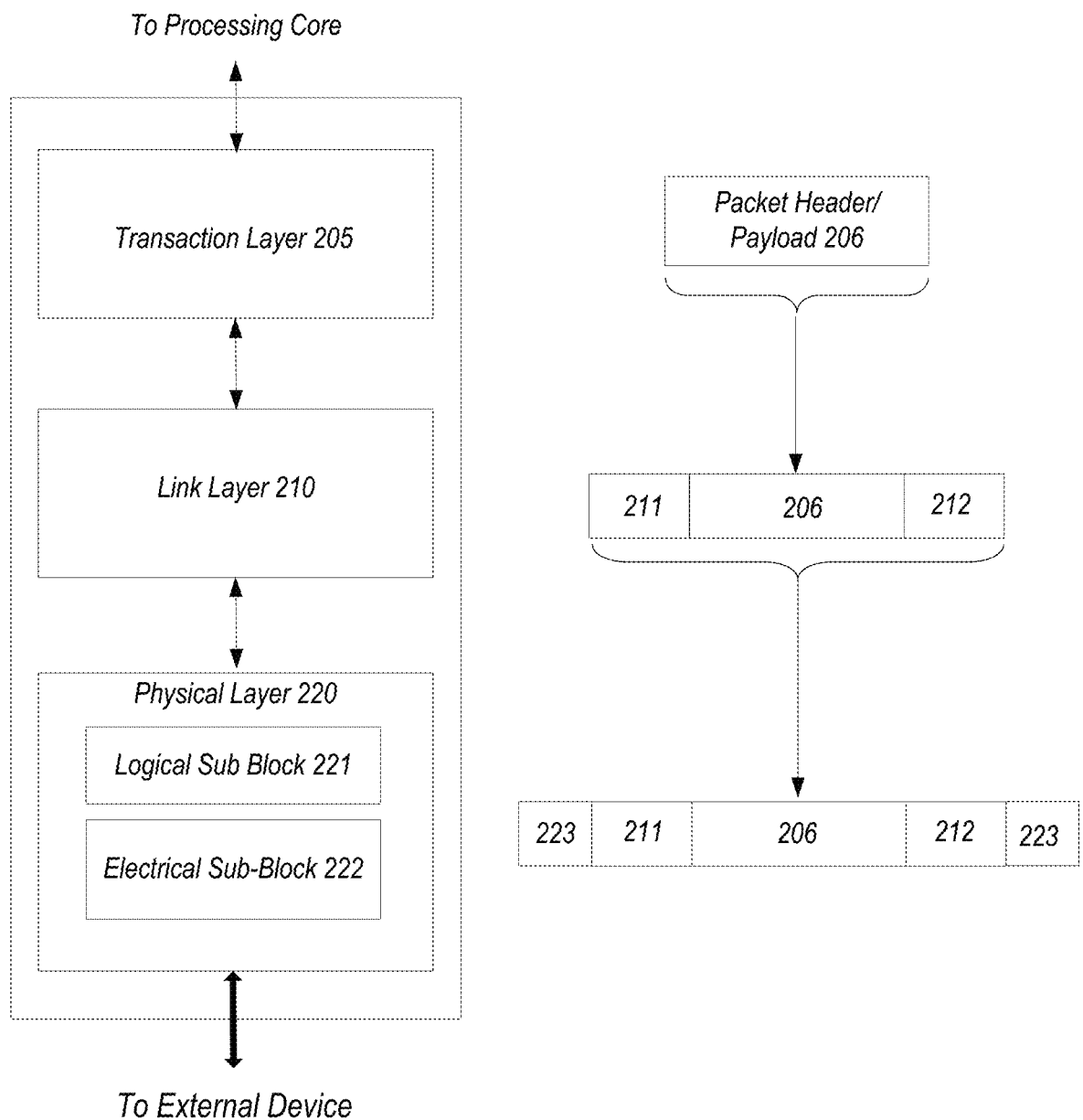
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
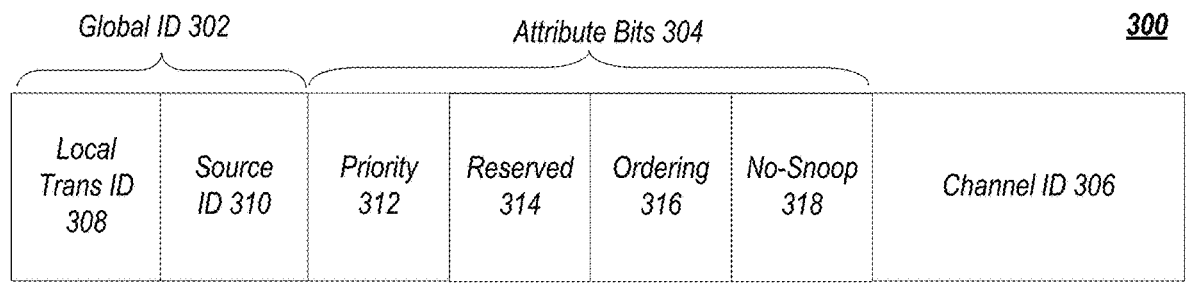
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
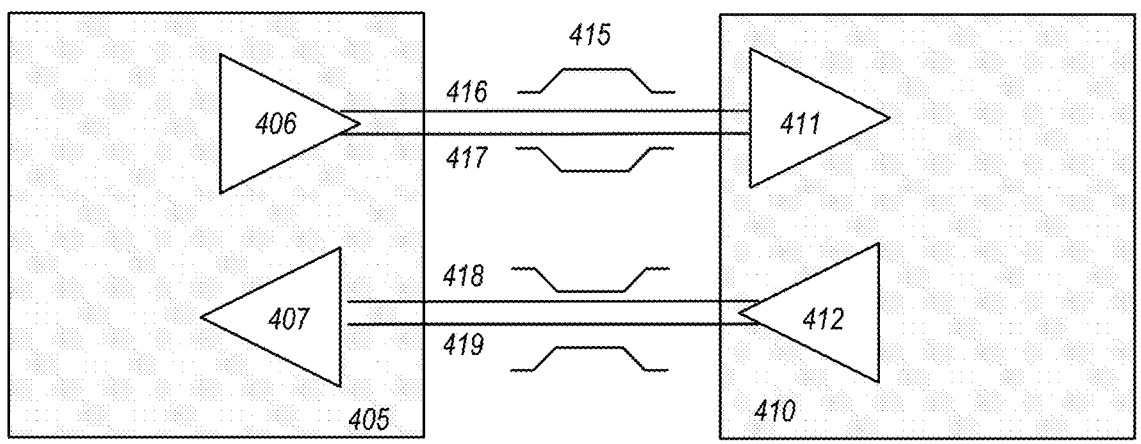
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In one embodiment, Ultra Path Interconnect (UPI) may be utilized to interconnect two or more devices. UPI can implement a next-generation cache-coherent, link-based interconnect. As one example, UPI may be utilized in high performance computing platforms, such as workstations or servers, including in systems where PCIe or another interconnect protocol is typically used to connect processors, accelerators, I/O devices, and the like. However, UPI is not so limited. Instead, UPI may be utilized in any of the systems or platforms described herein. Furthermore, the individual ideas developed may be applied to other interconnects and platforms, such as PCIe, MIPI, QPI, etc.

Figure 5:
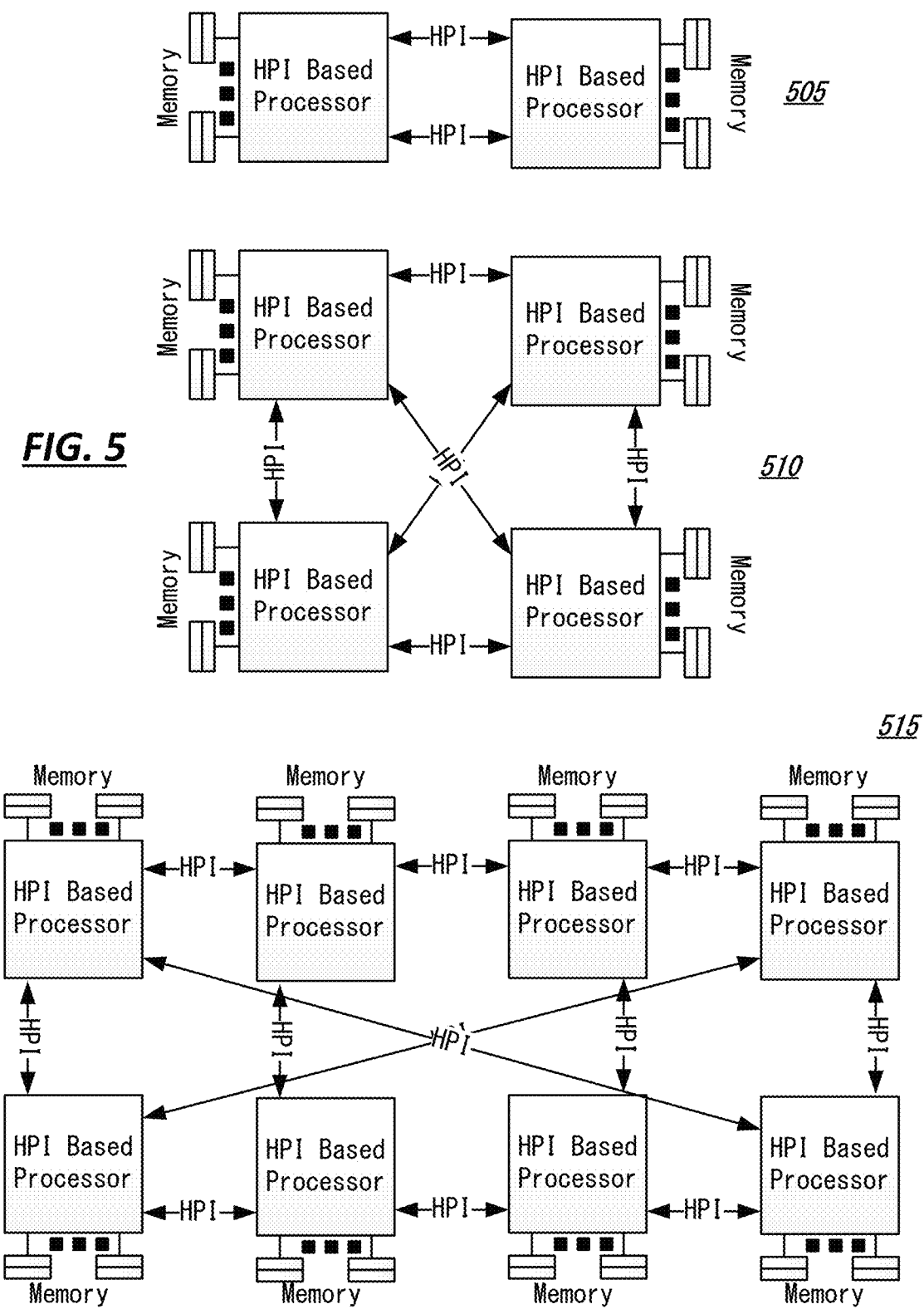
FIG. 5 illustrates embodiments of potential high performance, processor-to-processor interconnect configurations.

To support multiple devices, in one example implementation, UPI can include an Instruction Set Architecture (ISA) agnostic (i.e. UPI is able to be implemented in multiple different devices). In another scenario, UPI may also be utilized to connect high performance I/O devices, not just processors or accelerators. For example, a high performance PCIe device may be coupled to UPI through an appropriate translation bridge (i.e. UPI to PCIe). Moreover, the UPI links may be utilized by many UPI based devices, such as processors, in various ways (e.g. stars, rings, meshes, etc.). FIG. 5 illustrates example implementations of multiple potential multi-socket configurations. A two-socket configuration 505, as depicted, can include two UPI links; however, in other implementations, one UPI link may be utilized. For larger topologies, any configuration may be utilized as long as an identifier (ID) is assignable and there is some form of virtual path, among other additional or substitute features. As shown, in one example, a four socket configuration 510 has an UPI link from each processor to another. But in the eight socket implementation shown in configuration 515, not every socket is directly connected to each other through an UPI link. However, if a virtual path or channel exists between the processors, the configuration is supported. A range of supported processors includes 2-32 in a native domain. Higher numbers of processors may be reached through use of multiple domains or other interconnects between node controllers, among other examples.

The UPI architecture includes a definition of a layered protocol architecture, including in some examples, protocol layers (coherent, non-coherent, and, optionally, other memory based protocols), a routing layer, a link layer, and a physical layer. Furthermore, UPI can further include enhancements related to power managers (such as power control units (PCUs)), design for test and debug (DFT), fault handling, registers, security, among other examples. FIG. 5 illustrates an embodiment of an example UPI layered protocol stack. In some implementations, at least some of the layers illustrated in FIG. 5 may be optional. Each layer deals with its own level of granularity or quantum of information (the protocol layer 620a,b with packets 630, link layer 610a,b with flits 635, and physical layer 605a,b with phits 640). Note that a packet, in some embodiments, may include partial flits, a single flit, or multiple flits based on the implementation.

As a first example, a width of a phit 640 includes a 1 to 1 mapping of link width to bits (e.g. 20 bit link width includes a phit of 20 bits, etc.). Flits may have a greater size, such as 184, 192, or 200 bits. Note that if phit 640 is 20 bits wide and the size of flit 635 is 184 bits then it takes a fractional number of phits 640 to transmit one flit 635 (e.g. 9.2 phits at 20 bits to transmit an 184 bit flit 635 or 9.6 at 20 bits to transmit a 192 bit flit, among other examples). Note that widths of the fundamental link at the physical layer may vary. For example, the number of lanes per direction may include 2, 4, 6, 8, 10, 12, 14, 16, 18, 20, 22, 24, etc. In one embodiment, link layer 610a,b is capable of embedding multiple pieces of different transactions in a single flit, and one or multiple headers (e.g. 1, 2, 3, 4) may be embedded within the flit. In one example, UPI splits the headers into corresponding slots to enable multiple messages in the flit destined for different nodes.

Physical layer 605a,b, in one embodiment, can be responsible for the fast transfer of information on the physical medium (electrical or optical etc.). The physical link can be point-to-point between two Link layer entities, such as layer 605a and 605b. The Link layer 610a,b can abstract the Physical layer 605a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 620a,b relies on the Link layer 610a,b to map protocol messages into the appropriate message classes and virtual channels before handing them to the Physical layer 605a,b for transfer across the physical links. Link layer 610a,b may support multiple messages, such as a request, snoop, response, writeback, non-coherent data, among other examples.

Figure 6:
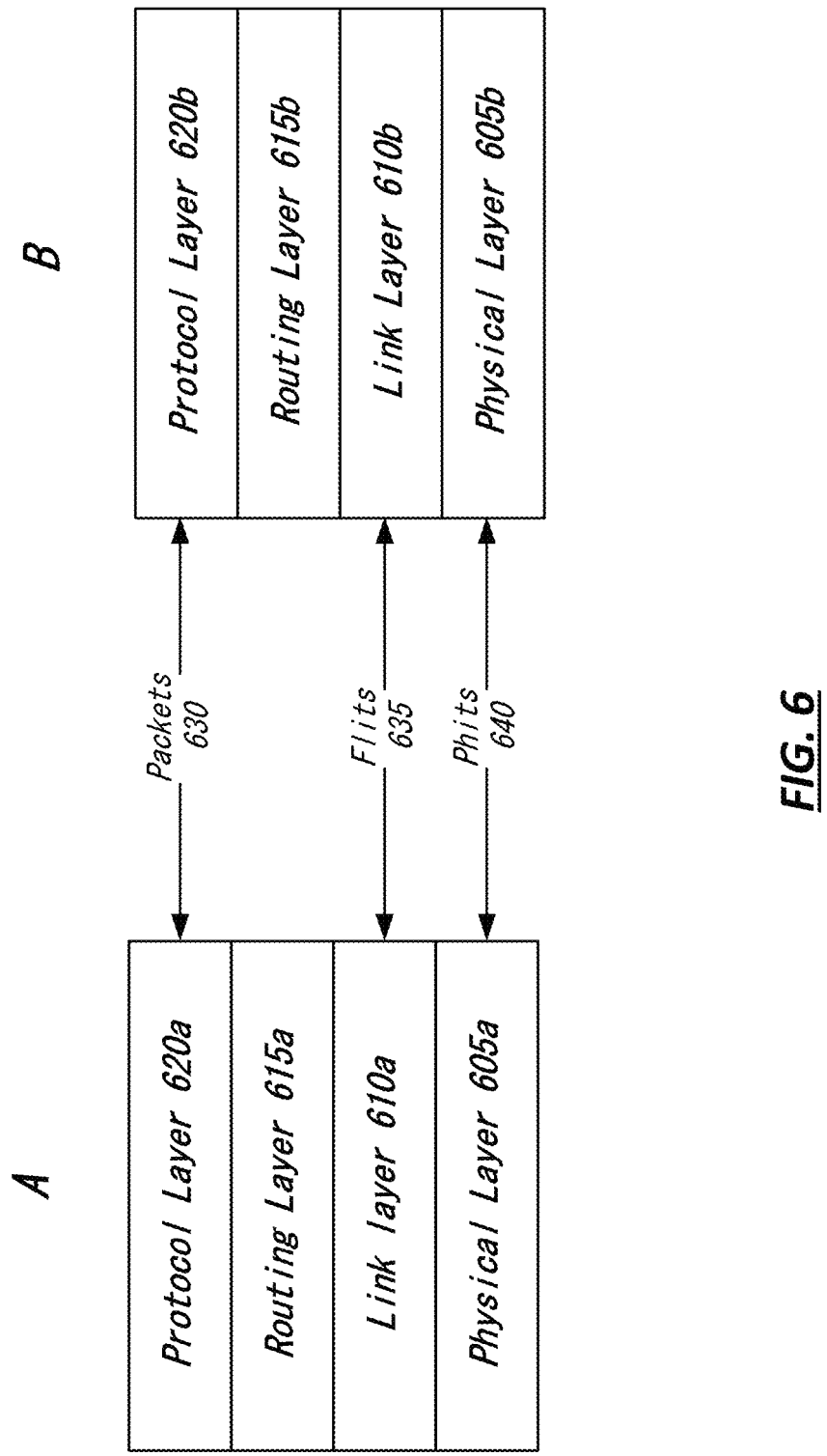
FIG. 6 illustrates an embodiment of a layered protocol stack associated with an interconnect.

The Physical layer 605a,b (or PHY) of UPI can be implemented above the electrical layer (i.e. electrical conductors connecting two components) and below the link layer 610a,b, as illustrated in FIG. 6. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer 605a,b, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 610a,b can be implemented so as to provide reliable data transfer between two protocol or routing entities. The Link layer can abstract Physical layer 605a,b from the Protocol layer 620a,b, and can be responsible for the flow control between two protocol agents (A, B), and provide virtual channel services to the Protocol layer (Message Classes) and Routing layer (Virtual Networks). The interface between the Protocol layer 620a,b and the Link Layer 610a,b can typically be at the packet level. In one embodiment, the smallest transfer unit at the Link Layer is referred to as a flit which a specified number of bits, such as 192 bits or some other denomination. The Link Layer 610a,b relies on the Physical layer 605a,b to frame the Physical layer's 605a,b unit of transfer (phit) into the Link Layer's 610a,b unit of transfer (flit). In addition, the Link Layer 610a,b may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 615a,b can provide a flexible and distributed method to route UPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a UPI packet into the UPI fabric. The lookup at an intermediate router may be used to route an UPI packet from an input port to an output port. The lookup at a destination port may be used to target the destination UPI protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 615a,b relies on the Link layer 610a,b for providing the use of up to three (or more) virtual networks (VNs)—in one example, two deadlock-free VNs, VN0 and VN1 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In some implementations, UPI can utilize an embedded clock. A clock signal can be embedded in data transmitted using the interconnect. With the clock signal embedded in the data, distinct and dedicated clock lanes can be omitted. This can be useful, for instance, as it can allow more pins of a device to be dedicated to data transfer, particularly in systems where space for pins is at a premium.

In some implementations, a link, such as a link compliant with PCIe, USB, UPI, or other interconnect protocol, can include one or more retimers or other extension devices, such as a repeater. A retimer device (or simply "retimer"), can include active electronic devices that receive and re-transmit (retime) digital I/O signals. Retimers can be used to extend the length of a channel that can be used with a digital I/O bus.

FIGS. 7A-7C are simplified block diagrams 700a-c illustrating example implementations of a link interconnecting two system components, or devices, such as upstream component 705 and downstream component 710. An upstream component 705 and downstream component 710 can be connected directly, in some instances, with no retimers, redrivers, or repeaters disposed on the link between the two components 705, 710, such as shown in the example of FIG. 7A. In other instances, a retimer (e.g., 715) can be provided to extend the link connecting upstream component 705 and downstream component 710, such as illustrated in FIG. 7B. In still other implementations, two or more retimers (e.g., 715, 720) can be provided in series to further extend a link connecting upstream component 705 and downstream component 710. For instance, a particular interconnect technology or protocol may specify a maximum channel length and one or more retimers (e.g., 715, 720), can be provided to extend the physical length of the channel connecting two devices 705, 710. For instance, providing retimers 715, 720 between upstream component 705 and downstream component 710 can allow a link three times the maximum length specified for a link without these retimers e.g., 715, 720, among other example implementations.

A link incorporating one or more retimers can form two or more separate electrical sub-links at data rates comparable to data rates realized by links employing similar protocols but with no retimers. For instance, a link including a single retimer can form a link with two separate sub-links, each operating at 8.0 GT/s or higher. FIGS. 8A-8B illustrate simplified block diagrams 800a-b of example links including one or more retimers. For instance, in FIG. 8A, a link connecting a first component 805 (e.g., an upstream component) to a second component 810 (e.g., a downstream component) can include a single retimer 815a. A first sublink 820a can connect the first component 805 to the retimer 815a and a second sublink 820b can connect the retimer 815a to the second component. As shown in FIG. 8B, multiple retimers 815a, 815b can be utilized to extend a link. Three sublinks 820a-c can be defined through the two retimers 815a, 815b, with a first sublink 815a connecting the first component to the first retimer 815a, a second sublink connecting the first retimer 815a to the second retimer 815b, and the third sublink 815c connecting the second retimer 815b to the second component.

As shown in the examples of FIGS. 8A-8B, in some implementations, a retimer can include two pseudo ports, and the pseudo ports can determine their respective downstream/upstream orientation dynamically. Each retimer 815a, 815b can have an upstream path and a downstream path. Further, retimers 815a, 815b can support operating modes including a forwarding mode and an executing mode. A retimer 815a, 815b in some instances can decode data received on the sub-link and re-encode the data that it is to forward downstream on its other sublink. In some cases, the retimer can modify some values in the data it receives, such as when processing and forwarding ordered set data. Additionally, a retimer can potentially support any width option as its maximum width, such as a set of width options defined by a specification such as PCIe.

As data rates of serial interconnects (e.g., PCIe, UPI, USB, etc.) increase, retimers are increasingly used to extend the channel reach. Retimers may capture the received bit stream prior to regenerating and re-transmitting the bit stream. In some cases, retimers may be protocol-aware and possess a full physical layer or even protocol stack to allow the retimer to participate in link negotiation (LTSSM), including transmitter/receiver equalization, and other link training activities. However, in high speed links implementing a retimer with a full protocol stack or complete physical or link layer logic, etc., may add unacceptable latency for links that connect two or more devices over one or more retimers. Indeed, there are growing numbers of applications that are likely to utilize retimers or other channel extension devices as the operating frequencies of external interfaces continue to increases while channel improvement improves more at a more modest pace. Further, many applications call for longer channel lengths, such as data center and server applications where interconnect channels can span several inches, pushing or exceeding the maximum channel lengths supported natively by emerging high speed interconnects. For example, PCI Express Gen 4, designed to operate at a frequency of 16.0 GT/s, may provide for a particular limited maximum channel length (e.g., 14" or less). For server applications, where the channel lengths may typically exceed 20 inches, a retimer, redriver, or other repeater elements may be sought after to extend the channel. Similarly, for an Ultra Path Interconnect (UPI) cache-coherent interface, extension devices may be likewise utilized to support longer-length platforms at 10.4 GT/s, among other examples.

Developing and implementing retimers for high speed interfaces may face a variety of issues. For example, in high speed cache-coherency protocols such as UPI, a channel may be extremely sensitive to latency, such that adding additional latency of 30 nsec per retimer hop becomes untenable due to the performance loss introduced through the retimer(s). Latency may also be an issue in examples such as PCIe, such as in memory applications (e.g., Memory Drive and Memory Services Processor), and such challenges are only expected to worsen as the next-generation non-volatile memory (NVM) technologies provide higher bandwidth and lower latency, closing the gap with double data rate (DDR) memory (e.g., DDR synchronous dynamic random-access memory (SDRAM)). While analog redrivers may be thought of as an option in latency-sensitive applications (as analog redrivers tend not introduce such latency issues), simple extension devices are unable to facilitate link initialization and link equalization/adaptation functionality provided for certain interconnect protocols. Such link initialization and equalization phases may be critical for facilitating reliable high speed links. For instance, an analog redriver does not participate in link initialization and equalization as it fails to recreate the transmit equalization space (among other example failings) and thus has limited utility as an extension solution, particularly in systems supporting open slots and connectors.

Another example issue in the development of commercially viable retimer devices is that various protocols utilize different physical layers (PHYs) and developing multiple protocol-specific versions of a retimer may be expensive and not ideal. While a retimer with a physical mux to separate between several different PHYs may be a possible solution, such a solution may involve expanding the footprint of the device (to accommodate the multiple protocol-specific logic), which may not only be expensive, but may be undesirable as such a device may take up valuable board real estate along with power. However, as platforms may utilize a combination of different interconnects and corresponding protocol, multiple different retimers may need to be supported in some systems, posing validation and interoperability challenges.

In some example implementations, one or more of the example issues discussed herein may be addressed through the provision of a multi-protocol capable low-latency retimer that has a low-latency by-pass path for normal traffic when operating in a common clock mode. Such multi-protocol low-latency retimers may be capable of handling protocols such as PCI Express and Ultra Path Interconnect (UPI) to extend the reach between a CPU and a downstream device or between two processor nodes (e.g., and their respective UPI controllers or agents). In some implementation, a retimer may be enhanced to include receiver detection logic (e.g., to support receiver detection events and states of a corresponding link) and monitoring logic to decode in-band messages to be regenerated and forwarded by the retimer to its destination on the other end of the link and extract information related to attributes, states, and transitions on the link including speed changes, transmitter equalization (or adaptation), and electrical idle entry, among other potential examples. The retimer (and corresponding CPUs or agent logic) may be further enhanced to support a sideband channel to connect the retimer to one or more CPUs coupled to the link and allow the CPU to coordinate and direct aspects of transmitter equalization via the sideband interface to the retimer. Further, retimers and CPUs (or CPU agent logic) may be additionally enhanced to generate protocol specific in-band handshake messages on behalf of the retimer (e.g., a handshake in association with transmitter equalization). The enhanced retimer can realize support for link training and equalization, while avoiding latency introduced through traditional retimer solutions. For instance, traditional PCIe retimers incur the latency of implementing a fully functional PCIe PCS and logical PHY or equivalent. In some implementations, an enhanced retimer may achieve low latency performance comparable to protocol agnostic retimers as the additional logic to decode protocol specific equalization and speed change requests is provided to be separate from (and operate in parallel with) the main data path. For instance, the retimer may only implement a minimal amount of protocol specific logic with the remaining supporting logic implemented in the CPU to which the retimer is coupled (e.g., via a sideband channel).

Figure 9B:
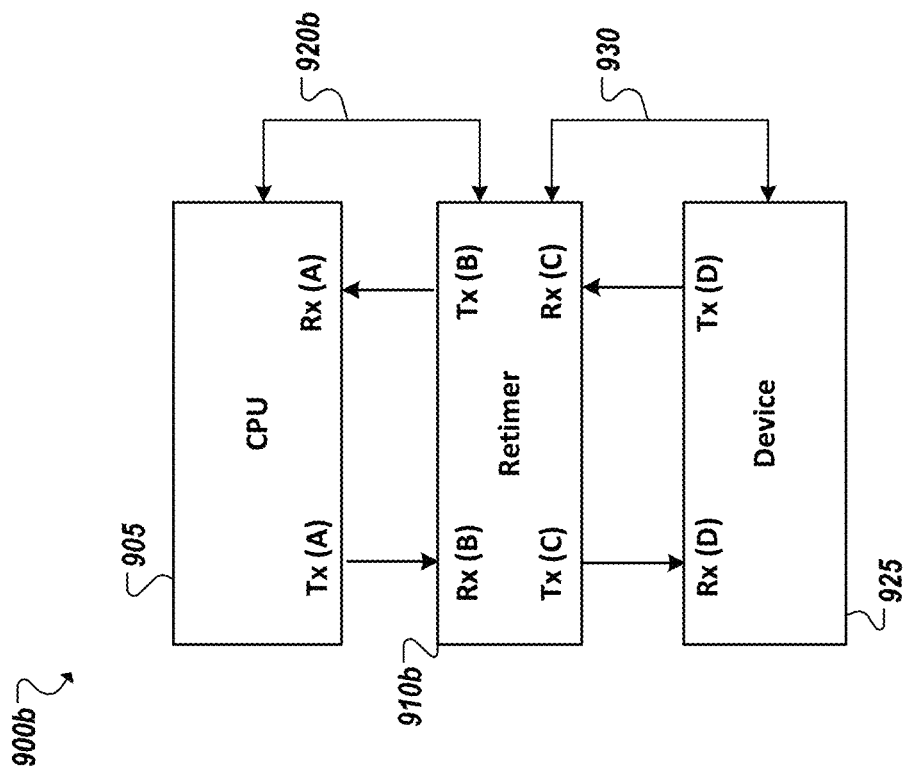
FIGS. 9A-9B illustrate simplified block diagrams of links including a retimer coupled to one or more endpoint devices via a sideband channel.
Figure 9A:
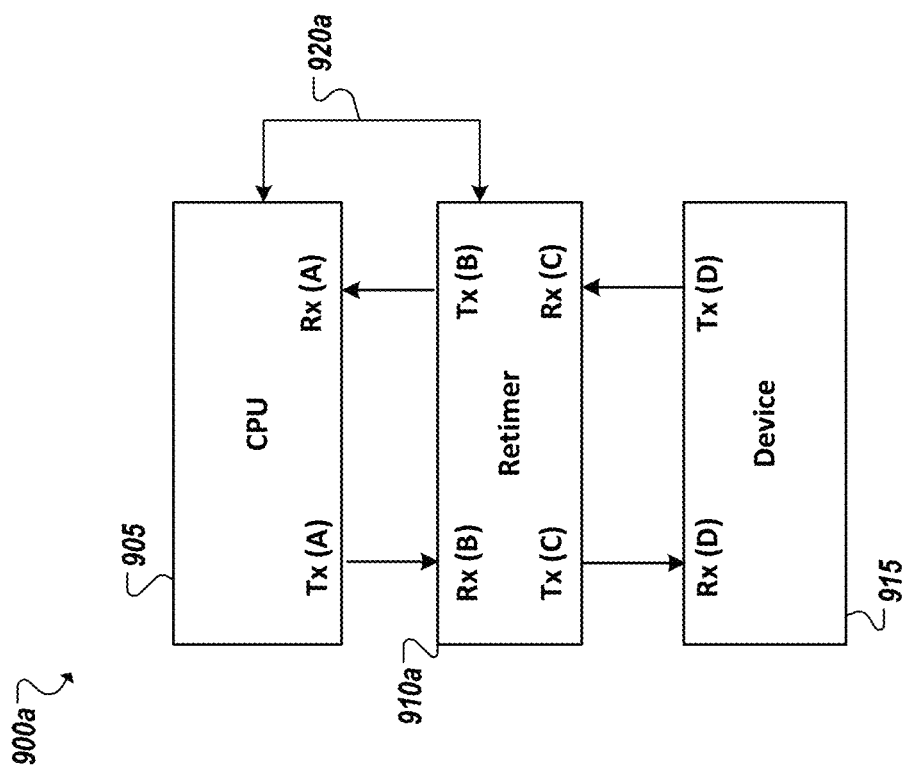

Turning to FIGS. 9A-9B, simplified block diagrams 900a-b are shown illustrating example implementations of enhanced retimers equipped with select logic to enable participation of the retimers in specific link training, equalization, and link state transition activities. As shown in FIG. 9A, in some implementations, a processor device, such as CPU 905, may be connected to an endpoint device 915, such as an add-in card, via a link that includes a retimer 910a. Additionally, the retimer 910a may be coupled to the CPU 905 via a separate, lower frequency sideband connection 920a. An in-band channel may be established between the CPU 905 and device 915 to define the main protocol interface for the link. The sideband channel 920a may be used to facilitate a low frequency sideband interface enabling communications between the CPU 905 and retimer 910a. In some implementations, the sideband interface may be according to a protocol such as MDIO or I2C. The sideband interface 920a may be utilized for messaging to allow the CPU to supplement the minimized protocol logic of an example enhanced retimer (e.g., 910a) to allow protocol-defined features (e.g., handshakes, speed changes, equalization, link training, etc.) to not be interrupted by the presence of the retimer. Further, while retimers may include a full protocol stack, PHY, etc., such processing at the retimer may introduce unacceptable additional latency, which may be minimized by providing minimal protocol logic on the enhanced retimer and off-loading remaining protocol logic onto the CPU (or even multiple CPUs, such as shown in FIG. 9B).

In FIG. 9B, a link may couple two processing devices, with the link including one or more retimer devices (e.g., 910b) to extend the physical reach of the link. In this example, sideband interfaces 920b, 930 may be provided to allow the retimer(s) 910b to interface with each of the connected CPUs 905, 925. Accordingly, the resources of each of the connected CPUs 905, 925 may be accessed to assist the retimer(s) (e.g., 910b) to participate in protocol events and activities, such as link training, equalization, speed changes, etc. Further, while the examples of FIGS. 9A-9B show the use of a single retimer to extend a link, it should be appreciated that more than one retimer may be used. In such instances, each of the multiple retimers in a link may be coupled via a respective sideband channel to at least one CPU connected by the link. As an example, in a link coupling a CPU and device (such as in FIG. 9A) each of multiple retimers included in the link may be coupled to the same CPU using respective sideband channels. In examples where a link couples two CPUs (such as in FIG. 9B), some of the retimers may couple to one of the CPUs while other retimers used in the link couple to the other CPU using a sideband interface. In other examples, one or more of the retimers used in the link may couple through sideband channels to both CPUs connected using the link, among other examples. Further, some multi-retimer links may be configured such that the retimers are inserted in parallel, while in other cases the multiple retimers may be inserted in parallel with each retimer handling a subset of the lanes of a multi-lane link, among other examples.

Figure 10:
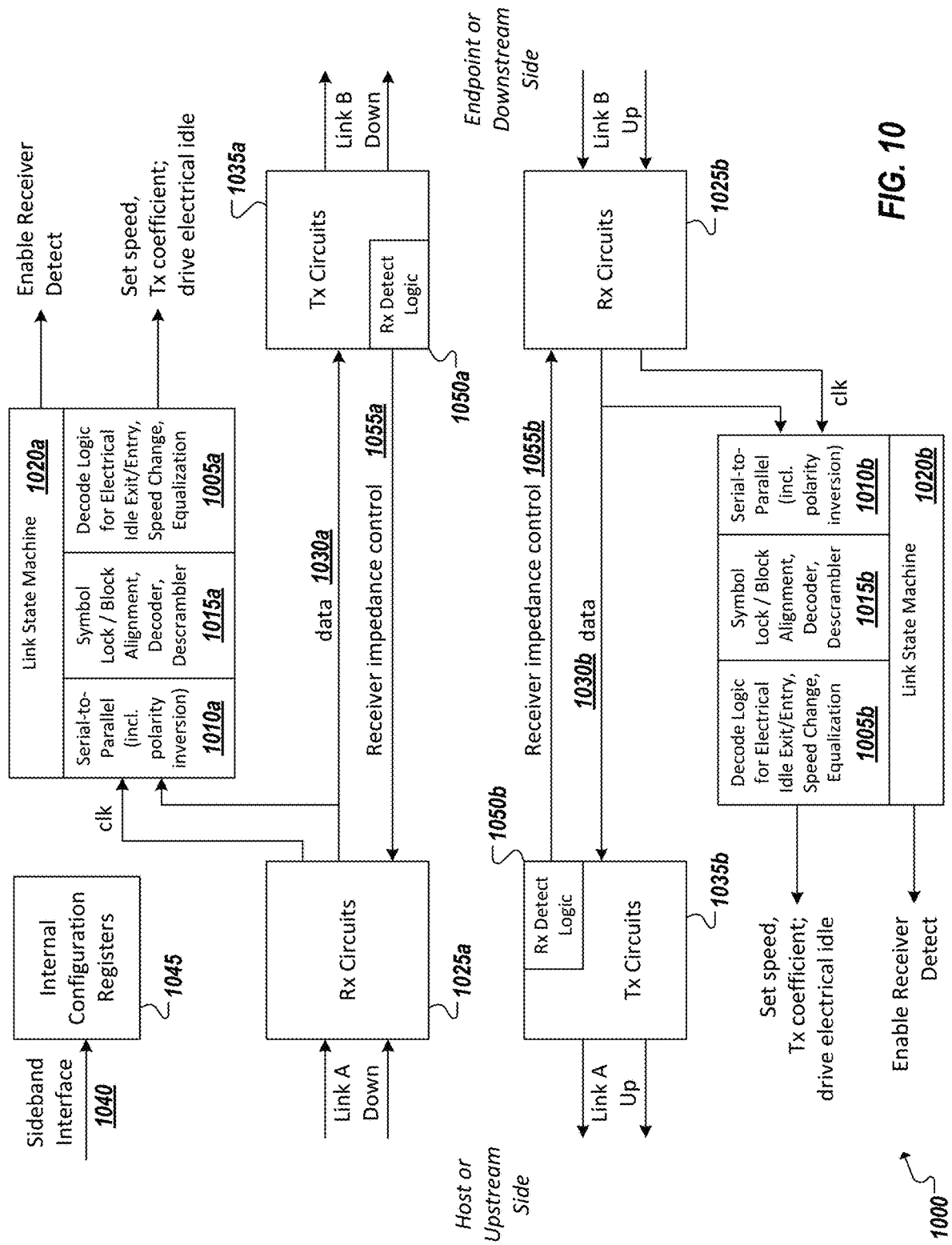
FIG. 10 illustrates a simplified block diagram of logic of an example retimer device.

Turning to FIG. 10, a simplified block diagram 1000 is shown of components of an example enhanced retimer. In this example, retimer logic corresponding to a single lane of a multiple lane link is shown. Accordingly, the components illustrated in FIG. 10 (and other examples herein) may be replicated for each of the multiple lanes supported by a retimer. Further, in this particular example, the base retimer logic is enhanced to support activities of a PCIe-compliant link. For instance, a retimer may include logic to support such activities as electrical idle exit/entry, speed changes, and equalization, as defined in the PCIe specification.

For instance, In PCIe, data rate (or "speed") changes may be requested by one of the devices connected on the PCIe link. For instance, a downstream port of a device may request speed change through Equalization (EQ) Training Sequence 1 (TS1) Ordered Sets (OSes) to inform the upstream port of the other device. For instance, a defined sequence of ordered sets may be sent each with one or more bits (e.g., a speed change bit in a PCIe TS1 or TS2 ordered set) set to indicate a speed change. The receiving device may respond to confirm or deny the request to change speed by sending a corresponding sequence of ordered sets to the requesting device. If the request is acknowledged, the link can be retrained (using further sequences of ordered sequences) to operate at the new speed. In another example, PCIe can provide for an electrical idle state and outline a protocol for entering and exiting electrical idle. For instance, a particular data sequence may be defined to indicate an exit from electrical idle, such as an electrical idle exit ordered set (EIEOS). A transmitting device may send a unique EIEOS pattern (e.g., defined in the PCIe spec) to inform the receiver device that the transmitter is signaling an electrical idle exit. The EIEOS pattern may guaranty that the receiver will properly detect the electrical idle exit condition. Likewise, an EIEOS may be defined to indicate electrical idle entry. In one example, a PCIe EIEOS may be a repeating pattern of eight "1's" followed by eight "0's", repeated for a total of 128 unit intervals (UI).

A retimer may also be provided with logic to at least partially participate in equalization or adaptation of a link. For instance, in PCIe, equalization A link equalization procedure is defined to enable components to adjust the transmitter and receiver setup of each lane to improve the signal quality and meet link requirements specified for compliance with the interconnect protocol (e.g., to facilitate a link operating reliably at 8.0 GT/s data rate). In one example, a PCIe equalization procedure includes four phases. Phase information and equalization information may be sent in fields within ordered sets (e.g., TS1 ordered sets) sent during equalization. For instance, in Phase 0 of equalization, a Downstream Port communicates the Transmitter preset values and the Receiver preset hints for each lane of a link to the Upstream Port using equalization EQ TS2 OSes. The Upstream Port may then transmit TS1 OSes. In Phase 1, both components make the link to exchange TS1 OSes to complete remaining phases to fine-tune the remaining Transmitter/Receiver pairs. For instance, Downstream Port may initiate Phase 1 by transmitting TS1 OSes to the Upstream Port using preset values. The Upstream Port receives these TS1 Ordered Sets and transitions to Phase 1 (where it transmits TS1 OSes). The Downstream Port ensures that it can reliably receive the bit stream from the Upstream Port to continue through the rest of the Phases when it receives TS1 OSes from the Upstream Port before it moves on to Phase 2. For instance, the devices may assess patterns sent during equalization to determine a bit error ratio (BER) realized on each pair. If the BER is sufficiently low (e.g., 10-4) the device may determine it is ready to move on to the next Phase.

Continuing with the preceding example, in Phase 2, the Upstream Port adjusts the Transmitter setting of the Downstream Port along with its own Receiver setting, independently, on each Lane, to ensure it receives the bit stream compliant with requirements defined for compliant lanes (e.g., have a BER is less than 10-12). The Downstream Port initiates the move to Phase 2 by transmitting TS1 OSes to the Upstream Port. The Downstream Port advertises the Transmitter coefficients and the preset it is using per the rules below in Phase 1 for preset and in Phase 2 for preset and coefficients. The Upstream Port receives these OSes in Phase 2 and may request different coefficient or preset settings and continue to evaluate each setting iteratively until it arrives at the best setting for operating the Downstream Lanes. After the Upstream Port has completed this Phase, it moves the Link to Phase 3 by transmitting TS1 OSes encoded to indicate the next equalization phase to the Downstream Port. In Phase 3, the Downstream Port adjusts the Transmitter setting of the Upstream Port along with its own Receiver setting, independently, on each Lane, using a handshake and evaluation process similar to Phase 2 with the OSes identifying that the equalization is Phase 3. The Downstream Port then signals the end of Phase 3 (and the equalization procedure) by transmitting TS1 Ordered Sets encoded to indicate the end of equalization. A variety of techniques may be used by a device to adjust the transmitter of its link partner and the evaluation of that transmitter set-up with its receiver. For instance, a component may request changes to any number of lanes and can request different settings for each Lane. Each requested setting can be a preset or a set of coefficients, with each device responsible for ensuring that at the end of the fine-tuning (e.g., Phase 2 for Upstream Ports and Phase 3 for Downstream Ports), its link partner has the appropriate transmitter settings in each lane to meet the link requirements defined by the protocol.

In another example, agents of UPI processors may work together to perform equalization, or adaptation, of a link. In one example, UPI may provide for transmitter adaptation During TX adaptation, both by having the UPI agents each act as loopback masters, with each transmitter sending a loopback pattern with the remote receiver checking the received patterns for bit errors. The receiver may either loopback the pattern with information encoded to provide feedback regarding the determined quality of the received patterns or encode error results in a register which the transmitter may access to adjust transmitter settings. The transmitter settings may be iteratively adjusted and the patterns resent until the setting of both transmitters are determined to be set to achieve target performance characteristics of the link. In one example, a UPI adaptation pattern may be generated using linear-feedback shift register (LFSR)-based pattern generators. For instance, two pattern buffers each of 128 bit and two 23-bit LFSR seed buffers, may be used to generate a sequence that is scrambled (e.g., using a pseudo random bit sequence (PRBS) generated by a Galois or Fibonacci LFSR) to generate pseudo random data sequences on each enabled lane of the link.

Rather than equipping a retimer with a full protocol stack or protocol layer, implementations of a low latency retimer may be equipped with portions of protocol specific logic required to handle (at the retimer) certain critical features such as dynamic speed change, transmitter equalization, electrical idle entry for power state changes, and receiver detection (e.g., for hot plug). In some cases, a retimer may be provided with multiple modules of protocol specific logic for multiple different protocols to allow the retimer to provide multi-protocol support (while not burdening the design with multiple alternative protocol stack logic blocks, etc.). Additional logic may also be provided in the CPU to allow some protocol specific functionality to be offloaded from the enhanced retimer and handled, instead, at the CPU. For instance, such additional CPU logic may include logic to generate in-band handshake responses on behalf of the retimer for equalization requests and communicate with the retimer via the sideband interface to facilitate some aspects of transmitter equalization. In some examples, generation of the in-band handshake response may include the generation of a TS1 ordered set on behalf of the retimer to indicate whether the coefficient values requested by the device are valid, among other examples.

For instance, as shown in the example of FIG. 10, in some implementations, decode logic 1005a,b may be provided to allow the retimer, at each lane, to detect various protocol-specific patterns and signals corresponding to various protocol activities and events. For example, the retimer may monitor the communication flowing through the retimer between the CPU and another device to identify specific events, such as electrical idle entry/exit, speed change, and equalization, such as described above. Further, the retimer may be provided with additional logic (e.g., 1010a-b, 1015a-b) consistent with other protocol-compliant devices, such as logic implemented in the physical coding sublayer (PCS) of the protocol (e.g., PCIe). As an example, protocol logic (e.g., 1010a-b, 1015a-b) may include serial-to-parallel logic, polarity inversion logic, symbol and block alignment logic, decoder and descrambler logic, among logic to implement various other functionality for use in decoding and processing patterns received at the retimer. Decode logic 1005a,b may be carefully tailored to contain minimal logic to identify particular performance-critical protocol activities, states, and events and to extract relevant information for the retimer to adjust itself appropriately to support proper event processing. Further, state machine logic 1020a,b may be provided for each lane to determine states for use in decoding communications passing through the retimer. The logic (e.g., 1005a-b, 1010a-b, 1015a-b, 1020a-b, etc.) may be replicated to support a multi-lane retimer.

As illustrated in the example of FIG. 10, an enhanced retimer can retain typical retiming functionality including receiver circuitry 1025a to interface with an upstream device (e.g., CPU or endpoint) and receive data 1030a to be retimed and sent on upstream transmitter circuitry 1035a to an upstream device (e.g., CPU or endpoint). Likewise, the upstream path may include receiver circuitry 1025b to retime data 1030b and send the data to an upstream device using transmitter circuitry 1035b. Further a sideband interface 1040 may be provided through which the retimer communicates with a CPU, for instance, to pass information for use by the CPU in performing protocol specific tasks in the presence of the retimer.

As introduced above, the retimer may implement a simple state machine (e.g., different from the state machines of the protocols supported by the retimer) to track basic link states in which the retimer is to participate in certain protocol specific activities. For instance, turning momentarily to FIG. 11, a block diagram 1100 is shown illustrating an example simplified state machine of an example enhanced retimer. The retimer may implement one finite state machine (FSM) for each upstream lane and one FSM for each downstream lane (e.g., 1020a-b in the example of FIG. 10). In one example, the state machine may include an initial reset state 1105, which may be transitioned from, after some time following the reset, to a receiver detection (Rx Detect) state 1110. In the Rx Detect state 1110, the retimer may periodically perform receiver detection on its upstream or downstream link. If a receiver is detected on a corresponding link, the state machine may transition from Rx Detect 1110 to a "Symbol Lock/Polarity Detect" state 1115 in which symbol lock is performed on incoming data and polarity is determined for the lane. With symbol lock and/or block alignment complete and the polarity determined, the state machine may transition to a "Monitor and React" state 1120, during which the retimer (e.g., using decode logic 1005a-b) monitors data being forwarded by the retimer for events relevant to various protocol-specific activities, such as speed change, electrical idle entry, and equalization. It should be appreciated that the link state machine of a protocol may be substantially different from the retimer state machine, however, some retimer states may correspond to link states. For instance, a "Monitor and React" state 1120 may correspond to link training states for a link, with an active link state being entered following the link training. Additional events may be detected and involve participation by the retimer after a link enters an active link state. For instance, a link reset or low power state entry may occur, which the retimer is to affirmatively detect and react to. For example, the retimer may detect a defined number of electrical idle OSes (EIOSes) on its upstream link, causing the retimer state machine to transition to an "Electrical Idle" state 1125, which may correspond to the link entering an idle link state. In the Electrical Idle state 1125, the retimer may be provided with functionality to transition its downstream link to a valid Electrical Idle state as quickly as possible (e.g., within 8 ns for PCIe) to meet a DC common voltage requirement in response to detecting a pattern at the retimer indicating that one of the devices on the link requests entry into an electrical idle state. Further, the retimer may be similarly equipped to identify patterns (e.g., EIEOSes) indicating an exit from an electrical idle state, and the retimer state machine may provide for a transitions from the Electrical Idle state 1125 to an "Electrical Idle Exit" state 1130. In this retimer state 1130, the retimer may power up its circuits in connection with the exit from an idle condition and then transition back to the Symbol Lock/Polarity Detect state in preparation for retraining of the newly awoken link, among other example implementations.

Figure 11:
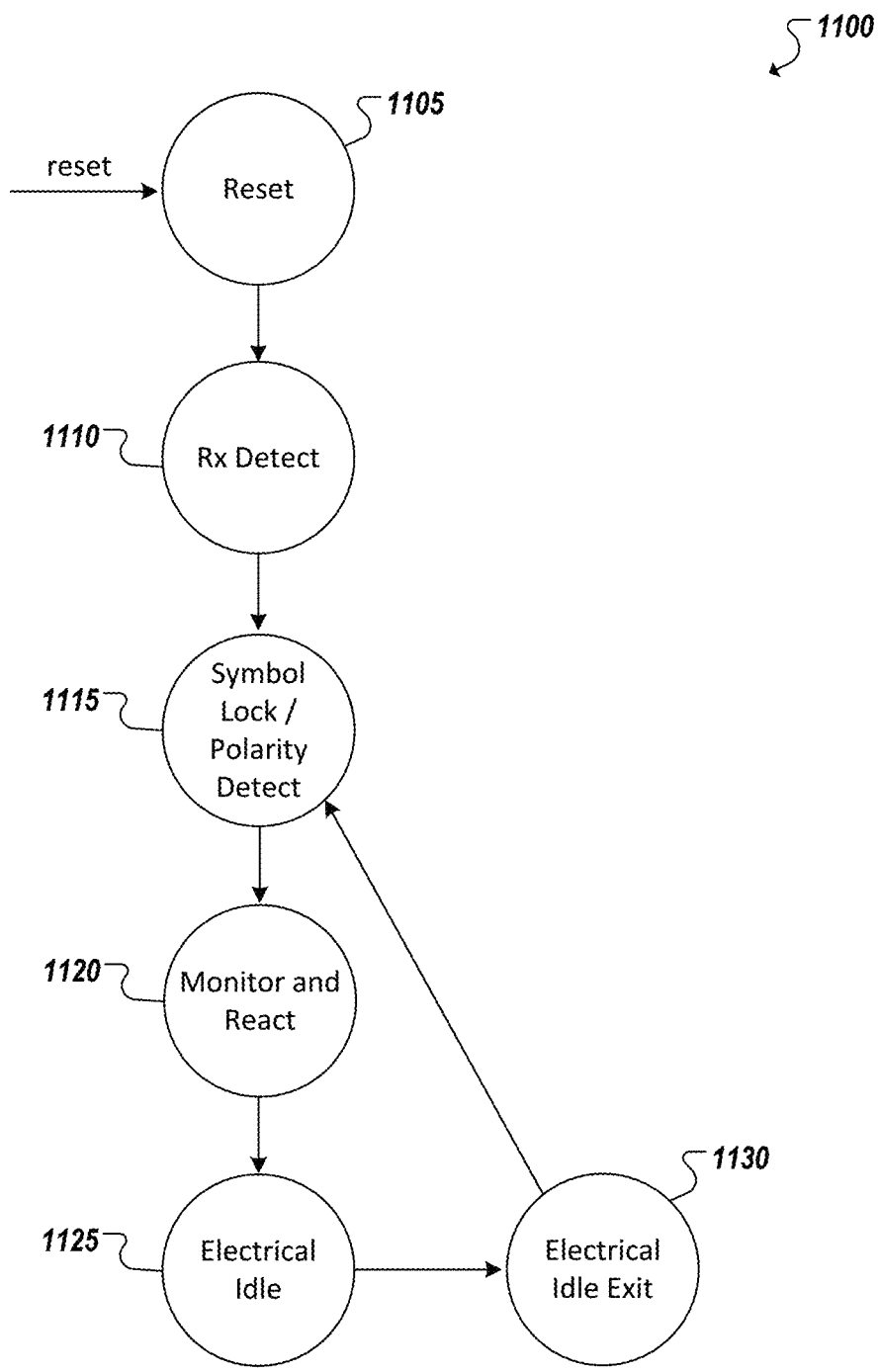
FIG. 11 illustrates a simplified block diagram representing an example state machine of a retimer device.

As noted in the example of FIG. 11, a retimer may be provided with additional logic to support receiver and/or transmitter detection states defined in a protocol. Turning again to FIG. 10, in one example, receiver detect may be defined in one or more protocols supported by the retimer and receiver detect logic (e.g., 1050a, 1050b). The receiver detect logic 1050a-b can intermittently test an interface for the presence of another device connected to the retimer over the link. When another device is present, a voltage or receiver impedance may be measured at the retimer interface. However, given the presence of the retimer, the other endpoint on the link will not be able to detect this change. Indeed, when a retimer is present, the other endpoint may mistakenly identify the retimer as the other endpoint. Accordingly, receiver detection logic 1050a-b may additionally "hide" the retimer from a first endpoint already connected to a link by selectively removing a termination or otherwise masking an impedance introduced by connecting the retimer to the first device. However, when the second device is added to the link, the receiver detect logic may generate a receiver impedance control signal or voltage (e.g., 1055a-b) to cause the retimer to terminate its upstream port to make it also "appear" on the link to the first device (e.g., as a proxy for the second device's terminations), among other examples.

A retimer may be enhanced to not only detect events from data (e.g., 1030a,b) passing through the retimer, but may also include logic to respond to detected events. For example, to support dynamic speed change, the retimer may identify a speed change request in patterns sent across the link and then utilize internal logic to monitor the speed change negotiation between the devices on the link (e.g., a CPU and a downstream device). For instance, for PCIe, the retimer may detect the defined number of consecutive TS2 ordered sets with a speed change bit set to 1b and further detect identical rate identifiers on its upstream link and on its downstream link, to determine that a speed change is underway. The retimer may then log the desired speed and effect the change quickly (e.g., within 800 ns for PCIe) such that the retimer also prepares to operate at the new speed (e.g., after its upstream and downstream links have entered electrical idle). In some cases, the new speed may be communicated to the retimer in association with the speed change data sequence by a CPU (over the sideband channel) and the retimer may acknowledge the speed change over the sideband channel, among other examples.

In some cases, a retimer may detect an event and include logic that responds to a detected event by interoperating with a CPU coupled by the link to enable the retimer to be adjusted so as to be transparent on the link when certain events and activities are initiated and performed (e.g., during link training). As an example, a retimer may detect the initiation of a link equalization procedure. In one implementation, transmitter equalization support may be implemented by providing logic in both the retimer as well as some supporting logic in a CPU on the link. In a traditional link, the two devices may account for a total of two transmitters (i.e., one at each device) that are to be equalized. However, adding a retimer to the link adds an additional two transmitters (one at the upstream side of the link (e.g., 1035b) and one at the downstream side of the link (e.g., 1035a)). Accordingly, to ensure proper functioning of the link, all four transmitters in this example would be equalized or adapted such that each has proper transmitter coefficients and settings to enable suitable signal quality. This can be facilitated by providing protocol logic (e.g., 1005a-b) in the retimer to support the retimer's participation in the link equalization/adaptation procedure.

As an example, in FIG. 9A, a CPU is connected to an add-in card device over a link including a single retimer. The three devices account for four transmitters for which proper transmitter coefficients are to be each determined and adopted to enable good signal quality. In one example, equalization may include dynamic adjustment of the transmitter coefficients for the downstream transmitter of the retimer (e.g., 910a) and the transmitter of the add-in card (e.g., 915). The downstream transmitter of the CPU 905 and upstream transmitter of the retimer 910a may just use presets (e.g., as attributes corresponding to these transmitters should be known). For instance, in an example of PCIe equalization for a link including a CPU connected to an add-in card device over a link including a single retimer (such as in FIG. 9A), the four phases of PCIe equalization utilizing the retimer can proceed, in Phase 0, with the CPU sending presets over the in-band channel to the add-in card for its upstream transmitter (which is to transmit data back to the CPU over the retimer). The CPU can further send presets to the retimer via sideband for the both of the retimer's upstream and downstream transmitters. In Phase 1, equalization test patterns may be sent upstream and downstream on the link, with all transmitters driving using their respective presets. The transmitter coefficients may be adjusted until the link is functional at $10^{-4}$ BER. In Phase 2, the add-in card (e.g., device 915) sends an in-band signal providing equalization feedback to the re-timer's downstream transmitter (which send data on to the add-in card) to adjust the corresponding coefficient. The enhanced retimer then decodes the TS1 ordered sets received on its upstream link to determine when the CPU and add-in card have entered Phase 2 of equalization and the re-timer extracts the adjusted transmitter coefficients for its downstream transmitter and starts driving data using the new coefficients within 500 ns. The CPU processes the same TS1 ordered set to check that the requested coefficients are valid for the re-timer and generates a handshake response to accept or reject the request. This happens in an iterative fashion with each iteration taking up to 2 ms. In Phase 3, the CPU (e.g., 905) is to adjust the add-in card's (e.g., 915) upstream transmitter. To accomplish this, the CPU communicates with the retimer (e.g., 910*a*) over the sideband channel (e.g., 920*a*) to extract feedback information developed by the re-timer (e.g., included in a register, such as in internal configuration register 1045 shown in the example of FIG. 10) describing the quality of the signal sent from the add-in card to the retimer.

Figure 12:
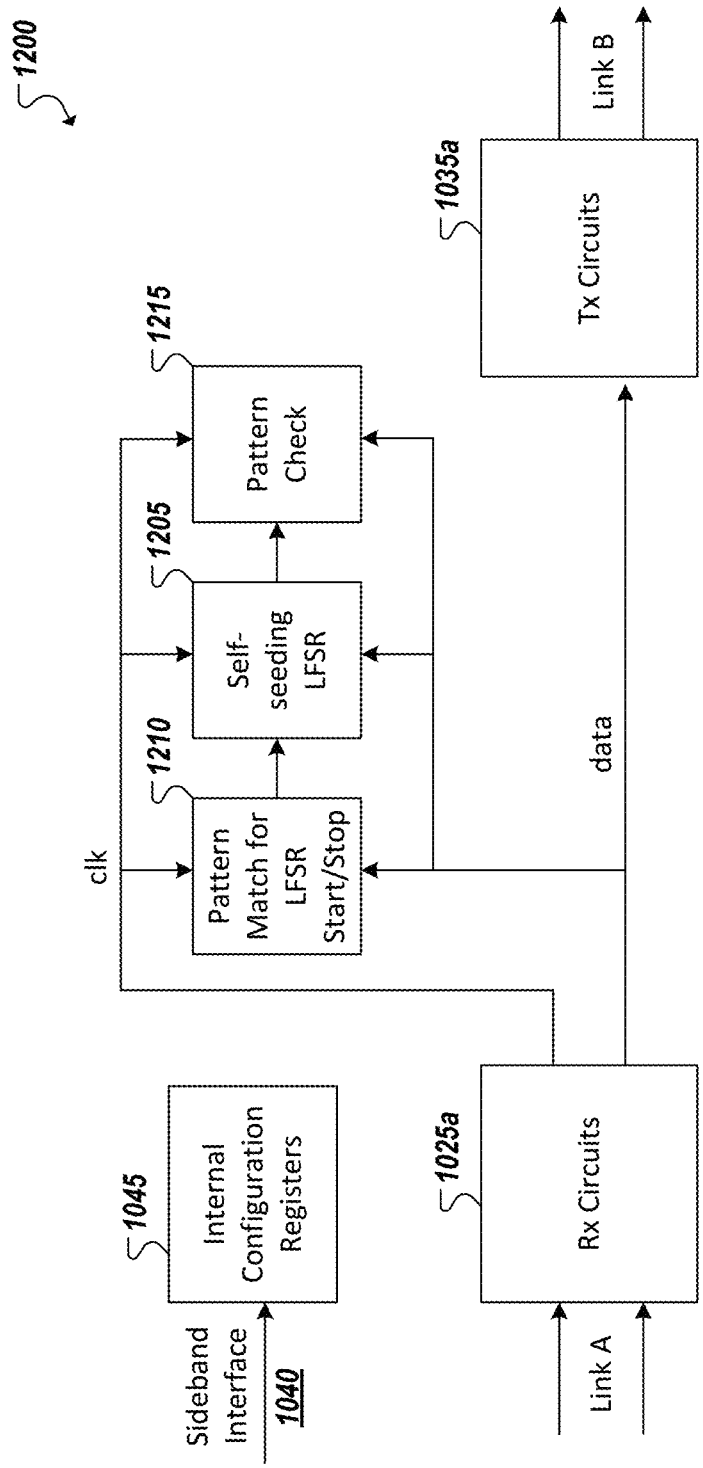
FIG. 12 illustrates a simplified block diagram of logic including protocol-specific logic in an example retimer device.

In other examples, two CPUs (or other processor devices) may be interconnected by a link extended by one or more retimers. For instance, a re-timer topology may involve two CPUs connected via a UPI link, such as in the example of FIG. 9B. Link equalization or adaptation of a UPI link including one or more retimers may be analogous to equalization in PCIe retimer links (e.g., as discussed above), however, the types of patterns utilized in link adaptation may be specific to UPI and additional logic may be provided in an enhanced retimer to support participation of the retimer in adaptation of a UPI link. For instance, a particular adaptation pattern may include or be based on a pseudorandom pattern, such as a pseudorandom bit sequence (PRBS). While the PRBS may appear random, to perform adaptation and detect errors in signals received from any one of the transmitters on the link, each element of the link should expect and be able to generate and verify the PRBS. Accordingly, the retimer may be provided with pattern generation logic to generate the expected pseudorandom signal. For instance, as shown in the example of FIG. 12, a block diagram 1200 illustrates example logic to generate a PRBS and detect errors in a PRBS pattern received at the retimer during adaptation of a link. Pattern generation logic of the retimer may include a self-seeding linear-feedback shift register 1205.

In one example, transmitter adaptation with a single retimer UPI link may begin with the boot processor communicating with the retimer to set up the retimer's adaptation pattern match logic 1210. For instance, in the example of FIG. 12, LFSR 1205 may be used by the retimer to self-generate the adaptation pattern and allow the retimer to assess incoming adaptation patterns (e.g., using pattern check logic 1215) to determine whether the incoming pattern deviates from the pattern generated by the retimer's LFSR 1205. From this comparison, the retimer can determine bit errors occurring in patterns received during adaptation. In one example, the boot processor can set the LFSR 1205 by sending a "start" pattern and a "stop" pattern used to trigger start and stop of the self-seeding LFSR. Start/stop pattern match logic 1210 may be provided to monitor signals received at the retimer and detect when such a start or stop pattern is received to begin self-seeding of the LFSR. The boot processor can further configure the retimer via the sideband channel to run at an operational mode frequency. The boot processor can set up its own transmitter coefficients and initially serve as loopback master by transmitting a PRBS pattern (e.g., generated by a similarly seeded LFSR at the boot processor) framed with the "start" and "stop" pattern. Upon detecting the "start" pattern, the re-timer enables its self-seeding LFSR 1205 and starts checking the incoming pattern for errors (e.g., using pattern check logic 1215) until the "stop" pattern is detected by pattern match logic 1215. In one example, the start and stop patterns may be a UPI start of data sequence (SDS) pattern and ending PRBS, but other alternative patterns may be used (e.g., to simplify the design).

The retimer can perform the pattern check and pattern check logic 1215 can generate pattern check metrics and store the pattern check metrics in a register 1045. The other processor device (e.g., "loopback slave") may similarly check the adaptation pattern as received from the retimer and report its check metric in a register. The pattern check results may then be read out of the register(s) by system management software assisting in the adaptation of the link. The boot processor may access the retimer via the sideband channel 1040 to read the pattern check metric generated by the retimer and direct the retimer to enter slow mode (while the other processor automatically transitions to slow mode at the end of the test). The boot processor may perform a slow mode in-band access of the remote processor (e.g., via the retimer) to read out the receiver metric results (from the other processor's register) of this transmitter adaptation iteration and determine whether another iteration is to be performed with changes to either its own or the retimer's transmitter settings. In the event that the boot processor determines that the retimer transmitter settings are to be adjusted, the boot processor may communicate the determined change to the retimer via the sideband channel 1040 to cause the changes to be applied in a subsequent iteration of the adaptation test.

In some instances, where a retimer is connected via sideband channels to each of the two processors, the remote CPU's metric may be accessed (e.g., read) by the boot processor via the sideband channels. In such instances, it may be possible to forego changing the retimer to slow mode between iterations. The settings of the transmitters may continue to be adjusted iteratively until the desired link quality metrics are observed. Once the settings have been successfully set in one direction of the link, the remote CPU may transition from "slave" to "master," with the previous master or boot processor transitioning to "slave." The new master processor may then drive further iterations of the adaptation pattern using similar techniques (and coordinating with the retimer via a respective sideband channel) to adapt the transmitters sending data in the other direction of the link.

Continuing with the example of FIG. 12, an LFSR (e.g., 1205) or other protocol-specific signal generation logic may be provided in some instances in connection with detection logic (e.g., 1005*a*-*b* of FIG. 10) to allow the detection logic to interpret signal encodings received at the retimer to be regenerated and forwarded onto the other endpoint of the link. For instance, some signals may include or be based on a PRBS generated using an LFSR seeded with a particular seed. The signal generation logic of the retimer, in some cases, may also include the LFSR, which may also be seeded with the particular seed (e.g., via a sideband communication), allowing the retimer to also generate the PRBS and compare this locally generated PRBS with the received PRBS (e.g., in connection with adaptation of the link). In other implementations, signal generation logic of the retimer may permit the retimer to unscramble received signals to decode the signals using detection logic, among other examples.

It should be appreciated that the circuitry and other logic specific to a first protocol (e.g., blocks 1205, 1210, 1215) may be combined with logic provided for a different second protocol to allow a retimer to be compatible with multiple different protocols. This can allow a single retimer to be manufactured that may be inserted into one of many different links irrespective of the link protocol used. A register (e.g., internal or external to the retimer) may be provided to designate which of the protocols is to apply in a given link and the retimer may disable logic not applicable to the selected protocol. Further, as shown in the examples of FIGS. 10 and 12, some logical blocks may be reused in two or more of the protocols supported by the retimer. For instance, receiver detection and electrical idle exit/entry may be functionally equivalent in two different interconnect protocols and the same logical blocks (e.g., receiver detect logic 1050*a-b* and electrical idle exit/entry logic) may be reused in the retimer when either protocol is selected to apply for a corresponding link in which the retimer is inserted, among other examples. In this manner, rather than providing full protocol stacks (or even full physical layers) for each of multiple interconnect protocols, a minimal set of logic may be provided in a retimer to allow the retimer to assist in a subset of the interconnect activities determined to be most critical in each one of potentially multiple different protocols, with logic being reused where possible. This can allow a more compact and less expensive implementation of a multi-protocol, low latency retimer, among other example advantages.

Figures 13A, 13B:
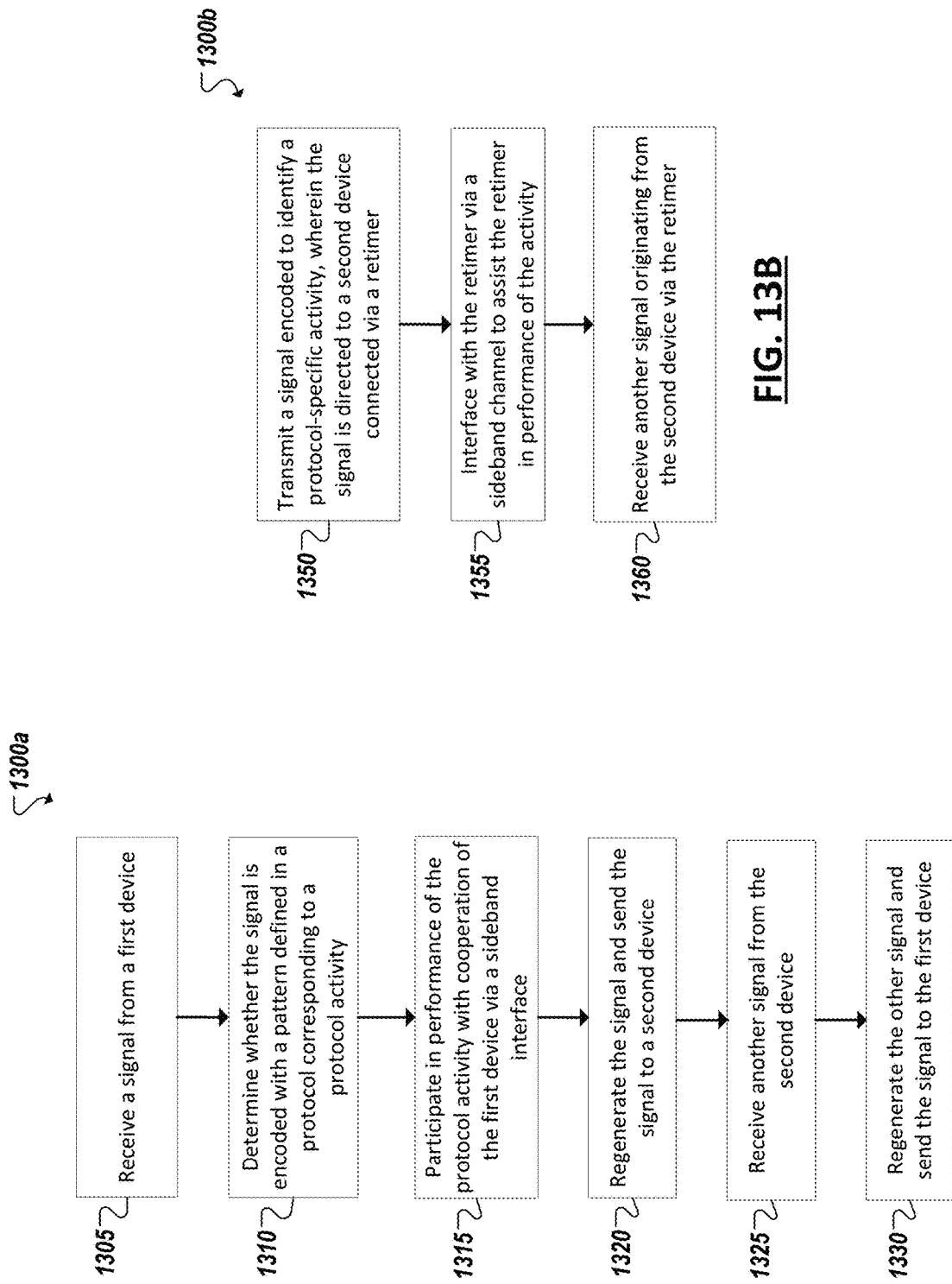
FIGS. 13A-13B are flowcharts illustrating example techniques in connection with a link including a retimer.

FIGS. 13A-13B are flowcharts 1300*a-b* illustrating example techniques involving a retimer configured to participate in protocol specific activities with assistance of a processor device connected on a link that includes the retimer. For instance, in FIG. 13A, a signal may be received 1305 on the link from a first of two endpoint devices connected on a link that includes a retimer. The retimer may determine 1310 whether the signal is encoded with a pattern defined in a protocol corresponding to any one of potentially multiple different protocol activities. For instance, various patterns may be sent from one endpoint to another to indicate entry or exit into or from a link or link training state. A pattern may additionally be used in the training of the link according to a particular protocol. Various protocol activities may be defined within a given interconnect protocol, the performance of which may be complicated by the presence of the retimer. The retimer may be configured to participate, at least partially, in the protocol activity so as to preserve the integrity of the link protocol and effectively hide the presence of the retimer from the endpoints. In some cases, one of the endpoint devices may be a processor and can include logic to support the retimer's participation in the protocol activity, for instance, through communication of data using a sideband channel connecting the retimer with the processor endpoint device. Protocol activities may include such examples as entering and exiting a low power or idle link state, equalizing transmitters and/or receivers, changing transmission speed, performing protocol defined handshakes, among other examples. In addition to assisting in the performance of one or more protocol activities, the retimer can additionally perform the traditional tasks of a retimer, including regenerating 1320 the receive signal and sending the signal on to the other second endpoint. Likewise, the retimer may receive 1325 signal from the second endpoint device and regenerate and send the signal on to the first device. In some cases, the retimer may perform signal detection (1310) and protocol activity participation in parallel with the retiming of received signals, such that no additional latency is added to the retiming of the signal from the support of the protocol activities.

Turning to FIG. 13B, a processor endpoint may be configured to connect to other devices using one or more interconnect protocols. A particular link may connect the processor endpoint to another endpoint via a retimer. The processor endpoint may transmit 1350 signals over the link. The processor endpoint may additionally interface 1355 with the retimer via a separate, out-of-band, sideband channel. The processor endpoint may additionally receive 1360 signals from the other endpoint over the retimer. The processor endpoint may possess supplemental logic to direct or otherwise assist the retimer to allow protocol activities to continue to be supported even with the insertion of the retimer. The retimer may only possess partial protocol logic, such as less than all of a protocol stack of the protocol, or even less than an entire layer (e.g., a physical layer or link layer) of the protocol, among other examples. Supplemental logic may be provided at the processor endpoint upon which the retimer may rely (e.g., via communications over the sideband channel) to allow the retimer to participate, where necessary, in various link training, handshakes, and other protocol-specific activities.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 14:
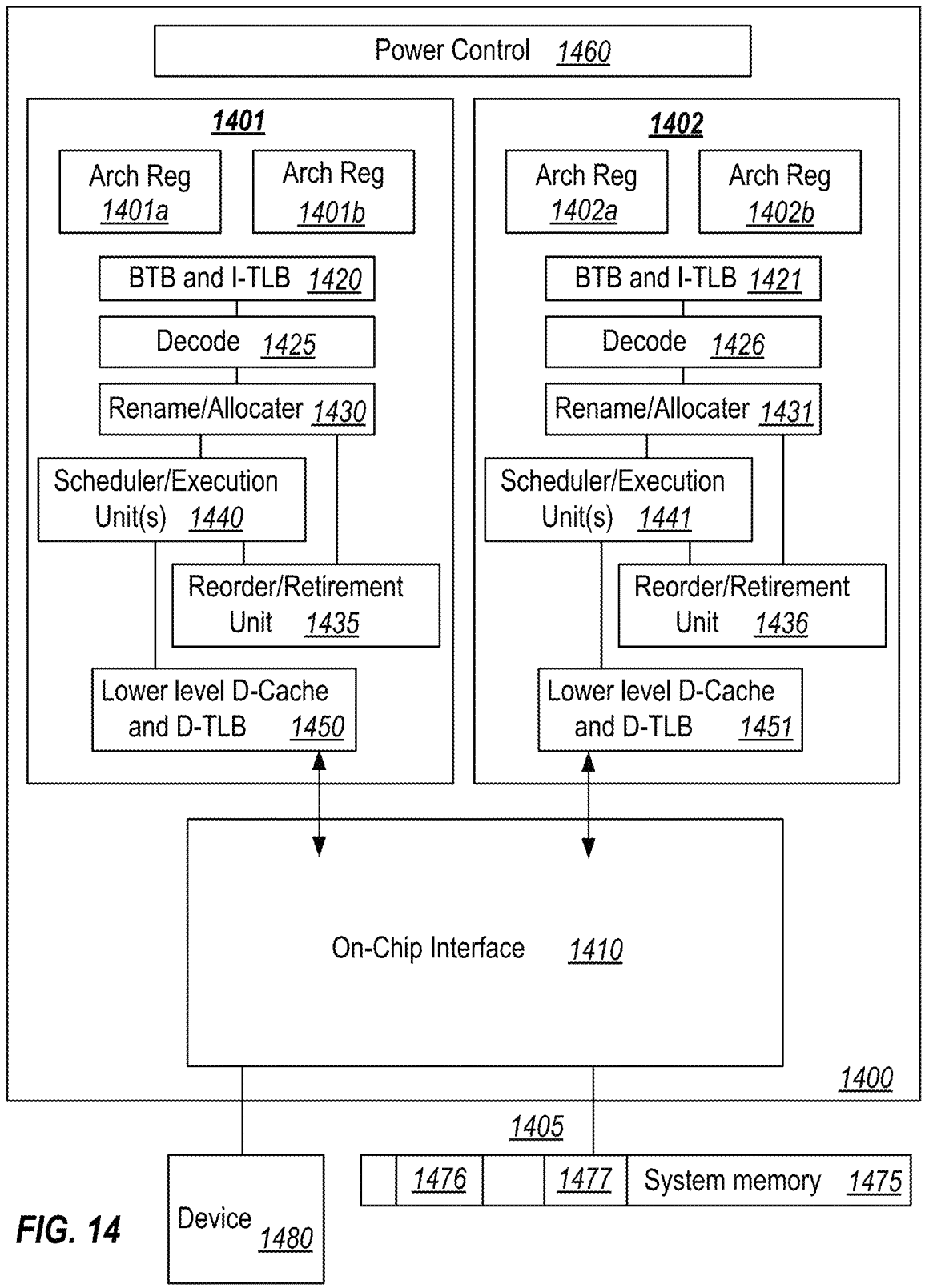
FIG. 14 illustrates an embodiment of a block diagram for a computing system including a multicore processor.

Referring to FIG. 14, an embodiment of a block diagram for a computing system including a multicore processor is depicted. Processor 1400 includes any processor or processing device, such as a microprocessor, an embedded processor, a digital signal processor (DSP), a network processor, a handheld processor, an application processor, a co-processor, a system on a chip (SOC), or other device to execute code. Processor 1400, in one embodiment, includes at least two cores—core 1401 and 1402, which may include asymmetric cores or symmetric cores (the illustrated embodiment). However, processor 1400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1400, as illustrated in FIG. 14, includes two cores—core 1401 and 1402. Here, core 1401 and 1402 are considered symmetric cores, i.e. cores with the same configurations, functional units, and/or logic. In another embodiment, core 1401 includes an out-of-order processor core, while core 1402 includes an in-order processor core. However, cores 1401 and 1402 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1401 are described in further detail below, as the units in core 1402 operate in a similar manner in the depicted embodiment.

As depicted, core 1401 includes two hardware threads 1401a and 1401b, which may also be referred to as hardware thread slots 1401a and 1401b. Therefore, software entities, such as an operating system, in one embodiment potentially view processor 1400 as four separate processors, i.e., four logical processors or processing elements capable of executing four software threads concurrently. As alluded to above, a first thread is associated with architecture state registers 1401a, a second thread is associated with architecture state registers 1401b, a third thread may be associated with architecture state registers 1402a, and a fourth thread may be associated with architecture state registers 1402b. Here, each of the architecture state registers (1401a, 1401b, 1402a, and 1402b) may be referred to as processing elements, thread slots, or thread units, as described above. As illustrated, architecture state registers 1401a are replicated in architecture state registers 1401b, so individual architecture states/contexts are capable of being stored for logical processor 1401a and logical processor 1401b. In core 1401, other smaller resources, such as instruction pointers and renaming logic in allocator and renamer block 1430 may also be replicated for threads 1401a and 1401b. Some resources, such as re-order buffers in reorder/retirement unit 1435, ILTB 1420, load/store buffers, and queues may be shared through partitioning. Other resources, such as general purpose internal registers, page-table base register(s), low-level data-cache and data-TLB 1415, execution unit(s) 1440, and portions of out-of-order unit 1435 are potentially fully shared.

Processor 1400 often includes other resources, which may be fully shared, shared through partitioning, or dedicated by/to processing elements. In FIG. 14, an embodiment of a purely exemplary processor with illustrative logical units/resources of a processor is illustrated. Note that a processor may include, or omit, any of these functional units, as well as include any other known functional units, logic, or firmware not depicted. As illustrated, core 1401 includes a simplified, representative out-of-order (OOO) processor core. But an in-order processor may be utilized in different embodiments. The OOO core includes a branch target buffer 1420 to predict branches to be executed/taken and an instruction-translation buffer (I-TLB) 1420 to store address translation entries for instructions.

Core 1401 further includes decode module 1425 coupled to fetch unit 1420 to decode fetched elements. Fetch logic, in one embodiment, includes individual sequencers associated with thread slots 1401a, 1401b, respectively. Usually core 1401 is associated with a first ISA, which defines/specifies instructions executable on processor 1400. Often machine code instructions that are part of the first ISA include a portion of the instruction (referred to as an opcode), which references/specifies an instruction or operation to be performed. Decode logic 1425 includes circuitry that recognizes these instructions from their opcodes and passes the decoded instructions on in the pipeline for processing as defined by the first ISA. For example, as discussed in more detail below decoders 1425, in one embodiment, include logic designed or adapted to recognize specific instructions, such as transactional instruction. As a result of the recognition by decoders 1425, the architecture or core 1401 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1426, in one embodiment, recognize the same ISA (or a subset thereof). Alternatively, in a heterogeneous core environment, decoders 1426 recognize a second ISA (either a subset of the first ISA or a distinct ISA).

In one example, allocator and renamer block 1430 includes an allocator to reserve resources, such as register files to store instruction processing results. However, threads 1401a and 1401b are potentially capable of out-of-order execution, where allocator and renamer block 1430 also reserves other resources, such as reorder buffers to track instruction results. Unit 1430 may also include a register renamer to rename program/instruction reference registers to other registers internal to processor 1400. Reorder/retirement unit 1435 includes components, such as the reorder buffers mentioned above, load buffers, and store buffers, to support out-of-order execution and later in-order retirement of instructions executed out-of-order.

Scheduler and execution unit(s) block 1440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1450 are coupled to execution unit(s) 1440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1401 and 1402 share access to higher-level or further-out cache, such as a second level cache associated with on-chip interface 1410. Note that higher-level or further-out refers to cache levels increasing or getting further way from the execution unit(s). In one embodiment, higher-level cache is a last-level data cache—last cache in the memory hierarchy on processor 1400—such as a second or third level data cache. However, higher level cache is not so limited, as it may be associated with or include an instruction cache. A trace cache—a type of instruction cache—instead may be coupled after decoder 1425 to store recently decoded traces. Here, an instruction potentially refers to a macro-instruction (i.e. a general instruction recognized by the decoders), which may decode into a number of micro-instructions (micro-operations).

In the depicted configuration, processor 1400 also includes on-chip interface module 1410. Historically, a memory controller, which is described in more detail below, has been included in a computing system external to processor 1400. In this scenario, on-chip interface 1410 is to communicate with devices external to processor 1400, such as system memory 1475, a chipset (often including a memory controller hub to connect to memory 1475 and an I/O controller hub to connect peripheral devices), a memory controller hub, a northbridge, or other integrated circuit. And in this scenario, bus 1405 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1475 may be dedicated to processor 1400 or shared with other devices in a system. Common examples of types of memory 1475 include DRAM, SRAM, non-volatile memory (NV memory), and other known storage devices. Note that device 1480 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1400. For example in one embodiment, a memory controller hub is on the same package and/or die with processor 1400. Here, a portion of the core (an on-core portion) 1410 includes one or more controller(s) for interfacing with other devices such as memory 1475 or a graphics device 1480. The configuration including an interconnect and controllers for interfacing with such devices is often referred to as an on-core (or un-core configuration). As an example, on-chip interface 1410 includes a ring interconnect for on-chip communication and a high-speed serial point-to-point link 1405 for off-chip communication. Yet, in the SOC environment, even more devices, such as the network interface, co-processors, memory 1475, graphics processor 1480, and any other known computer devices/interface may be integrated on a single die or integrated circuit to provide small form factor with high functionality and low power consumption.

In one embodiment, processor 1400 is capable of executing a compiler, optimization, and/or translator code 1477 to compile, translate, and/or optimize application code 1476 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 15:
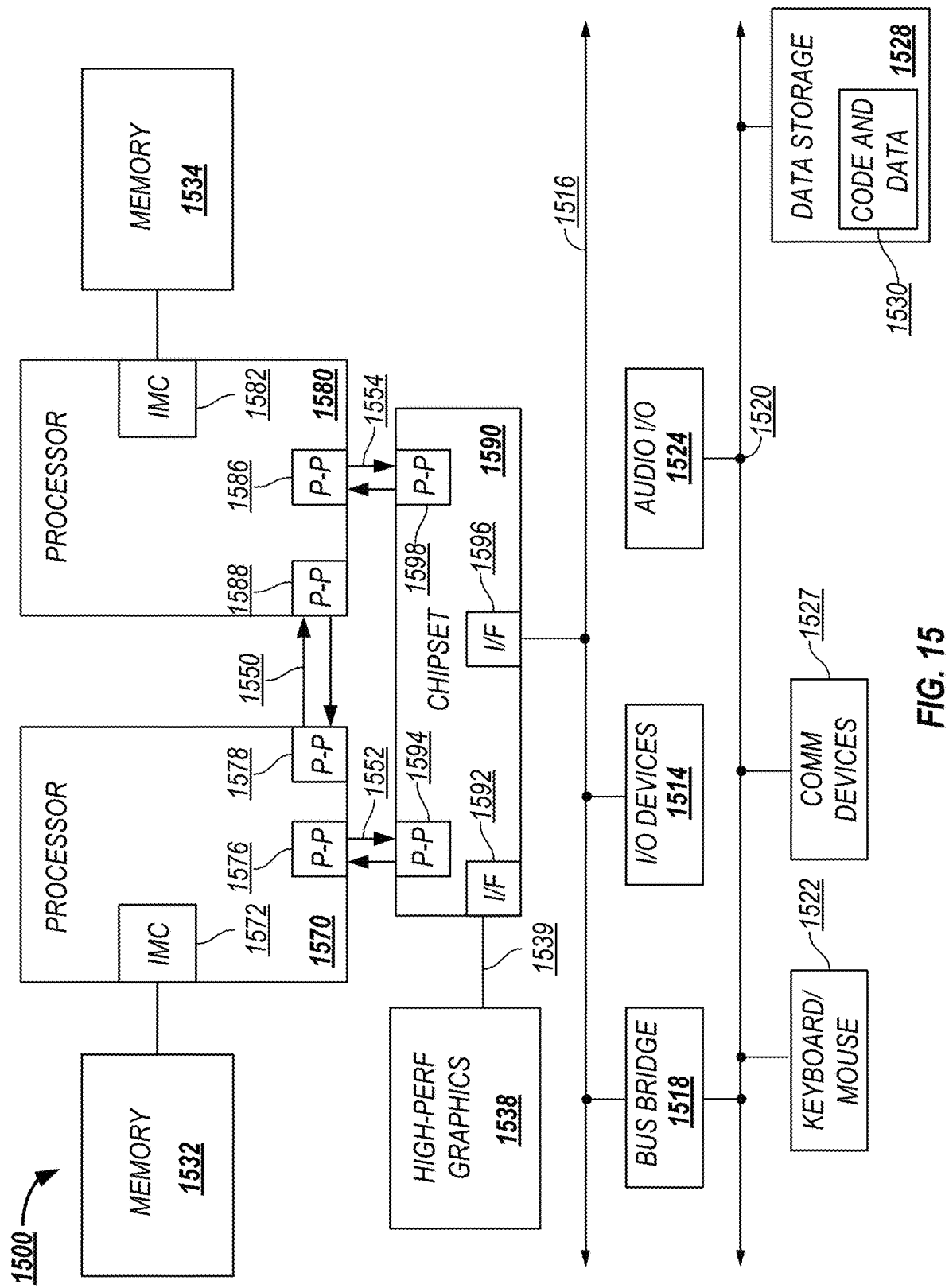
FIG. 15 illustrates an embodiment of a block for a computing system including multiple processors.

Referring now to FIG. 15, shown is a block diagram of a second system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of a processor. In one embodiment, 1552 and 1554 are part of a serial, point-to-point coherent interconnect fabric, such as a high-performance architecture. As a result, the invention may be implemented within the QPI architecture.

While shown with only two processors 1570, 1580, it is to be understood that the scope of the present invention is not so limited. In other embodiments, one or more additional processors may be present in a given processor.

Processors 1570 and 1580 are shown including integrated memory controller units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 each exchange information with a chipset 1590 via individual P-P interfaces 1552, 1554 using point to point interface circuits 1576, 1594, 1586, 1598. Chipset 1590 also exchanges information with a high-performance graphics circuit 1538 via an interface circuit 1592 along a high-performance graphics interconnect 1539.

A shared cache (not shown) may be included in either processor or outside of both processors; yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 are coupled to first bus 1516, along with a bus bridge 1518 which couples first bus 1516 to a second bus 1520. In one embodiment, second bus 1520 includes a low pin count (LPC) bus. Various devices are coupled to second bus 1520 including, for example, a keyboard and/or mouse 1522, communication devices 1527 and a storage unit 1528 such as a disk drive or other mass storage device which often includes instructions/code and data 1530, in one embodiment. Further, an audio I/O 1524 is shown coupled to second bus 1520. Note that other architectures are possible, where the included components and interconnect architectures vary. For example, instead of the point-to-point architecture of FIG. 15, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is a retimer device including retimer logic to receive a first signal from a first device and regenerate the first signal to send to a second device, and receive a second signal from the second device and regenerate the second signal to send to the first device, where the first device includes a processor device. The retimer device may further include a sideband interface to connect to the first device, and protocol logic to monitor the first signal, determine that the first signal includes a pattern defined in a protocol to identify a protocol activity, and participate in performance of the protocol activity using the sideband interface.

Example 2 may include the subject matter of example 1, where the protocol activity includes equalization of a link including the first device, the second device, and the retimer, and the retimer device is between the first and second devices in the link.

Example 3 may include the subject matter of example 2, where the first signal identifies that equalization of the link is to be performed, and the protocol logic is further to receive an equalization signal from the second device, determine whether errors are present in the equalization signal, and generate a metric based on whether errors are present in the equalization signal, where the sideband interface is used to provide the metric to the first device.

Example 4 may include the subject matter of example 3, where the equalization signal includes a first instance of the equalization signal and the protocol logic is further to generate a second instance of the equalization signal, where the first instance of the equalization signal is to be compared with the second instance of the equalizations signal to determine whether errors are present in the first instance of the equalization signal; send the second instance of the equalization signal to the first device over the link; access feedback data from the first device; and adjust transmitter parameters of the retimer device based on the feedback data.

Example 5 may include the subject matter of example 4, where the feedback data is received over the sideband channel.

Example 6 may include the subject matter of any one of examples 4-5, where the feedback data is received during a slow mode.

Example 7 may include the subject matter of any one of examples 4-6, where the protocol logic includes a signal generator to generate instances of the equalization signal.

Example 8 may include the subject matter of example 7, where the equalization signal includes a particular pseudo-random bit sequence (PRBS) and the signal generator includes a linear-feedback shift register (LFSR).

Example 9 may include the subject matter of any one of examples 4-8, where the protocol logic is further to receive a third instance of the equalization signal from the first device, determine whether errors are present in the third instance of the equalization signal, and generate a second metric based on whether errors are present in the third instance of the equalization signal.

Example 10 may include the subject matter of example 9, where the transmitter parameters correspond to a first transmitter of the retimer device to transmit data to the first device, a second transmitter of the retimer device is to transmit data to the second device, and the protocol logic is further to transmit a fourth instance of the equalization signal to the second device, access a second metric generated by the second device based on the fourth instance of the equalization signal, and adjust transmitter parameters corresponding to the second transmitter based on the second metric.

Example 11 may include the subject matter of any one of examples 1-10, where the protocol logic includes receiver detection logic to detect that another device connects to a transmitter of the retimer device, and selectively enable a termination of a receiver of the retimer device, where termination of the receiver is to indicate to the first device that the other device is connected to the transmitter of the retimer device and the other device includes the second device.

Example 12 may include the subject matter of example 11, where receiver detection logic is further to enter a receiver detect state defined in a state machine of the protocol and detects that the other device connects to the transmitter during the receiver detection state.

Example 13 may include the subject matter of any one of examples 1-12, where the protocol logic is to support a plurality of protocol activities for a plurality of different protocols.

Example 14 may include the subject matter of any one of examples 1-13, where the protocol logic includes less than an entire protocol stack of the protocol.

Example 15 may include the subject matter of any one of examples 1-14, where the protocol activity includes a speed change and the retimer is to operate a different speed as a result of the speed change.

Example 16 is a method including: receiving a signal from a processor at a retimer on a link; regenerating the signal; sending the regenerated signal to another device on the link; decoding the signal to detect a protocol specific event from the signal; and interfacing with the processor, using a sideband channel, to participate in performance of the protocol specific event.

Example 17 is an apparatus including a processor device including a protocol stack including physical layer logic to perform one or more protocol specific events, a sideband interface to interface with one or more retimers on a link, and assistance logic to perform at least a portion of a particular one of the protocol specific events on behalf of the retimer.

Example 18 may include the subject matter of example 17, further including the retimer and a second device.

Example 19 may include the subject matter of example 18, where the second device includes a second processor device.

Example 20 may include the subject matter of any one of examples 17-19, where the retimer includes a subset of physical layer logic of the protocol stack and the assistance logic is to supplement the subset of physical layer logic of the retimer.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A retimer device comprising:
    retimer circuitry to:
        receive a first signal from a first device and regenerate the first signal to send to a second device, wherein the first signal is sent in an in-band data path between the first device and second device and defined by a link, and the retimer device is positioned between the first and second devices on the link; and
        receive a second signal from the second device and regenerate the second signal to send to the first device, wherein the first device comprises a processor device, and the first and second signals are sent in association with a link training activity defined in a protocol to train the link;
    a sideband interface to connect the retimer device to the first device and define a sideband data path between the retimer device and the first device separate from the in-band data path, wherein the sideband data path excludes the second device; and
    protocol circuitry to:
        decode the first signal to determine, at the retimer device, that the first signal comprises a pattern, defined in the protocol, associated with the link training activity; and
        communicate with the first device over the sideband interface to participate in the link training activity based on detection of the pattern.

2. The retimer device of claim 1, wherein the link training activity comprises equalization of a link comprising the first device, the second device, and the retimer, and the retimer device is between the first and second devices in the link.

3. The retimer device of claim 2, wherein the first signal identifies that equalization of the link is to be performed, and the protocol circuitry is further to:
    receive an equalization signal from the second device;
    determine whether errors are present in the equalization signal; and
    generate a metric based on whether errors are present in the equalization signal, wherein the sideband interface is used to provide the metric to the first device.

4. The retimer device of claim 3, wherein the equalization signal comprises a first instance of the equalization signal and the protocol circuitry is further to:
    generate a second instance of the equalization signal, wherein the first instance of the equalization signal is to be compared with the second instance of the equalization signal to determine whether errors are present in the first instance of the equalization signal;
    send the second instance of the equalization signal to the first device over the link;
    access feedback data from the first device; and
    adjust transmitter parameters of the retimer device based on the feedback data.

5. The retimer device of claim 4, wherein the feedback data is received over the sideband channel.

6. The retimer device of claim 4, wherein the feedback data is received during a slow mode.

7. The retimer device of claim 4, wherein the protocol circuitry comprises a signal generator to generate instances of the equalization signal.

8. The retimer device of claim 7, wherein the equalization signal comprises a particular pseudorandom bit sequence (PRBS) and the signal generator comprises a linear-feedback shift register (LFSR).

9. The retimer device of claim 4, wherein the protocol circuitry is further to:
    receive a third instance of the equalization signal from the first device;
    determine whether errors are present in the third instance of the equalization signal; and
    generate a second metric based on whether errors are present in the third instance of the equalization signal.

10. The retimer device of claim 9, wherein the transmitter parameters correspond to a first transmitter of the retimer device to transmit data to the first device, a second transmitter of the retimer device is to transmit data to the second device, and the protocol circuitry is further to:
    transmit a fourth instance of the equalization signal to the second device;
    access a second metric generated by the second device based on the fourth instance of the equalization signal; and
    adjust transmitter parameters corresponding to the second transmitter based on the second metric.

11. The retimer device of claim 1, wherein the protocol circuitry comprises receiver detection circuitry to:
    detect that another device connects to a transmitter of the retimer device; and
    selectively enable a termination of a receiver of the retimer device, wherein termination of the receiver is to indicate to the first device that the other device is connected to the transmitter of the retimer device and the other device comprises the second device.

12. The retimer of claim 11, wherein receiver detection circuitry is further to enter a receiver detect state defined in a state machine of the protocol and detects that the other device connects to the transmitter during the receiver detection state.

13. The retimer of claim 1, wherein the protocol comprises a particular one of a plurality of different protocols, the protocol circuitry comprises logic to support a plurality of protocol activities for a plurality of different protocols including the link training activities of the particular protocol.

14. The retimer of claim 1, wherein the protocol circuitry implements less than an entire protocol stack of the protocol.

15. The retimer of claim 1, wherein the link training activity comprises a speed change and the retimer is to operate at a different speed as a result of the speed change.

16. A method comprising:
receiving a signal from a processor at a retimer on a link, wherein the link couples the processor to another device, the retimer is positioned between the processor and the other device on the link, and the signal is intended for the other device for use in training of the link;
regenerating the signal at the retimer;
sending the regenerated signal from the retimer to the other device on the link;
decoding the signal, at the retimer, to detect a protocol specific event from the signal, wherein the protocol specific event comprises a link training activity associated with the training of the link; and
participating, at the retimer, in performance of the link training activity, wherein the retimer interfaces with the processor during the link training activity using a sideband channel to complete performance of the link training activity with assistance of the processor, and the sideband channel defines a data path between the retimer and the processor and excludes the other device.

17. A system comprising:
a first device;
a processor device connected to the first device by a link, wherein the link comprises a retimer positioned between the first device and the processor device on the link, the link defines an in-band data path between the first device and the processor device, and the processor device comprises:
a protocol stack comprising physical layer circuitry to send a particular signal to the first device over the link in association with a link training activity defined in a particular interconnect protocol;
a sideband interface to interface with the retimer, wherein the sideband interface defines a sideband data path between the retimer and the processor device separate from the in-band data path, and the sideband data path excludes the first device; and
the retimer, wherein the retimer comprises protocol circuitry to:
detect the particular signal on the link;
determine that the particular signal comprises a pattern defined in the particular interconnect protocol to identify the link training activity; and
participate in performance of the link training activity using the sideband interface, wherein the processor device is to perform at least a portion of the link training activity on behalf of the retimer based on data received from the retimer over the sideband interface.

18. The system of claim 17, wherein the first device comprises a second processor device.

19. The system of claim 17, wherein the retimer comprises a subset of physical layer logic of the protocol stack, the processor device comprises assistance logic to supplement the subset of physical layer logic of the retimer, and the processor device uses the assistance logic to perform the portion of the link training activity on behalf of the retimer.

* * * * *